US012708068B2

(12) United States Patent
Baer et al.

(10) Patent No.: US 12,708,068 B2
(45) Date of Patent: Aug. 18, 2026

(54) ENERGY ABSORBING DEVICES

(71) Applicant: ACCELERATED SYSTEMS INC., Waterloo (CA)

(72) Inventors: Stanley Baer, Kitchener (CA); Tim Lambert, Los Angeles, CA (US)

(73) Assignee: Accelerated Systems Inc., Waterloo (CA)

(*) Notice: Subject to any disclaimer, the term of this patent is extended or adjusted under 35 U.S.C. 154(b) by 1042 days.

(21) Appl. No.: 17/864,709

(22) Filed: Jul. 14, 2022

(65) Prior Publication Data

US 2023/0027760 A1 Jan. 26, 2023

Related U.S. Application Data

(60) Provisional application No. 63/223,567, filed on Jul. 20, 2021.

(51) Int. Cl.

| | |
|---|---|
| ***A01D 34/81*** | (2006.01) |
| ***A01D 34/76*** | (2006.01) |
| *A01D 101/00* | (2006.01) |

(52) U.S. Cl.

CPC ............. *A01D 34/81* (2013.01); *A01D 34/76* (2013.01); *A01D 2101/00* (2013.01)

(58) Field of Classification Search

CPC .... A01D 34/76; A01D 34/81; A01D 34/6812; A01D 69/08; A01D 75/182; A01D 75/185

See application file for complete search history.

(56) References Cited

U.S. PATENT DOCUMENTS

| | | | | |
|---|---|---|---|---|
| 3,026,665 A * | 3/1962 | Hoff | A01D 34/6812 192/17 R |
| 3,252,304 A | 5/1966 | Moody | |
| 3,596,446 A * | 8/1971 | Bryan | A01D 34/6806 464/39 |

(Continued)

FOREIGN PATENT DOCUMENTS

| | | |
|---|---|---|
| CN | 111034455 A | 4/2020 |
| DE | 19960659 A1 | 6/2001 |

(Continued)

OTHER PUBLICATIONS

Northeast Battery, The PRos and Cons: Electric vs. Gas Powered, 2020, https://northeastbattery.com/pros-cons-electric-vs-gas-powered-lawn-mowers/ (Year: 2020).*

(Continued)

*Primary Examiner* — Justin C Mikowski
*Assistant Examiner* — Ashley A Kaercher

(57) ABSTRACT

There is provided a powered device and an energy absorbing device (EAD) for a powered device. The powered device includes an actuator to power a rotatable shaft coupled to a working member, a housing to house the actuator, a structural member to be coupled to the housing, and an EAD. The EAD is disposed between the housing and the structural member. The EAD is to absorb at least a portion of an impact energy of the working member striking an obstacle. Moreover, the EAD is to absorb the portion of the impact energy by being plastically deformed by the portion of the impact energy.

20 Claims, 23 Drawing Sheets

(56) References Cited

U.S. PATENT DOCUMENTS

| | | | | |
|---|---|---|---|---|
| 4,249,310 | A | 2/1981 | Secoura et al. | |
| 6,938,402 | B2 | 9/2005 | Arfstrom et al. | |
| 7,543,432 | B1 | 6/2009 | Osborne | |
| 2004/0083700 | A1 * | 5/2004 | Arfstrom | A01D 34/73<br>56/255 |
| 2017/0223892 | A1 | 8/2017 | Snapp | |

FOREIGN PATENT DOCUMENTS

| | | | | |
|---|---|---|---|---|
| EP | 0777958 | A1 * | 6/1997 | A01D 69/08 |
| EP | 1611782 | A1 | 1/2006 | |
| EP | 3508048 | A1 | 3/2018 | |
| JP | 2015188327 | A | 11/2015 | |
| KE | 101330881 | B1 | 11/2013 | |
| WO | 2019013989 | A1 | 1/2019 | |

OTHER PUBLICATIONS

B.J. Ramirez, Viscoelastic foam-filled lattice for high energy absorption, Dec. 2018, Mechanics of Materials, vol. 127, pp. 39-47 (Year: 2018).*

* cited by examiner

ENERGY ABSORBING DEVICES

CROSS-REFERENCE TO RELATED APPLICATION

This application claims the benefit of and priority from U.S. Provisional Patent Application No. 63/223,567, filed on Jul. 20, 2021, which is incorporated herein by reference in its entirety.

FIELD

This specification relates to energy absorbing devices, and in particular to energy absorbing devices for powered devices.

BACKGROUND

Some devices are powered by an actuator. In such powered devices, the actuator may actuate a working member to perform one or more functions of the powered device.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, a Ind Z (e.g., XYZ, XY, YZ, ZZ, and the like). Similar logic can be applied for two or more items in any occurrence of "at least one . . . " and "one or more . . . " language.

An aspect of the present specification provides a powered device comprising: an actuator to power a rotatable shaft coupled to a working member; a housing to house the actuator; a structural member to be coupled to the housing; and an energy absorbing device (EAD) disposed between the housing and the structural member, the EAD to absorb at least a portion of an impact energy of the working member striking an obstacle, the EAD to absorb the portion of the impact energy by being plastically deformed by the portion of the impact energy.

The portion of the impact energy may comprise at least a component of the impact energy comprising an off-axis load relative to a rotational axis of the shaft.

The housing may be coupled to the EAD, and the EAD may be coupled to the structural member.

The EAD may comprises an annulus having a body and an opening, the shaft to pass through the opening, the body defining a set of holes for coupling the EAD to one of the housing and the structural member, the body further comprising a set of mounting modules for coupling the EAD to the other one of the housing and the structural member, each mounting module comprising an extension terminating in a corresponding mounting hole, whereby a gap separates at least a portion of each extension from the rest of the body, at least a portion of at least one of the extensions to be at least partially deformed plastically by the portion of the impact energy.

One or more of the extensions may be shaped as a peninsula connected at one end to the body and a remainder of the peninsula being separated from the body by the corresponding gap.

One or more of the extensions may be formed integrally with the body.

The EAD may comprise an at least partially corrugated structure at least partially made of a sheet-like material, the at least partially corrugated structure to be at least partially deformed plastically by the portion of the impact energy.

The EAD may comprise a plastically deformable foam supported by a support member, the foam to be at least partially disposed between the housing and the structural member, the foam to be at least partially deformed plastically by the portion of the impact energy.

The EAD may comprise a first set of mounting points for being coupled to one of the housing and the structural member and a second set of mounting points for being coupled to the other one of the housing and the structural member, the EAD comprising a plastically deformable structure at each of the second set of mounting points.

The deformable structure may comprise one or more of a lattice and a truss.

The powered device may comprise a mower, the actuator may comprise an electric motor, the working member may comprise a cutting blade of the mower, and the structural member may comprise at least a portion of a deck of the mower.

Another aspect of the present specification provides an energy absorbing device (EAD) for a powered device: the EAD to be disposed between a housing for an actuator of the powered device and a structural member of the powered device, the actuator to power a rotatable shaft coupled to a working member, the structural member to be coupled to the housing, the EAD to absorb at least a portion of an impact energy of the working member striking an obstacle, the EAD to absorb the portion of the impact energy by being plastically deformed by the portion of the impact energy.

The portion of the impact energy may comprise at least a component of the impact energy comprising an off-axis load relative to a rotational axis of the shaft.

The housing may be to be coupled to the EAD, and the EAD may be to be coupled to the structural member.

The EAD may comprise an annulus having a body and an opening, the shaft to pass through the opening, the body defining a set of holes for coupling the EAD to one of the housing and the structural member, the body further comprising a set of mounting modules for coupling the EAD to the other one of the housing and the structural member, each mounting module comprising an extension terminating in a corresponding mounting hole, whereby a gap separates at least a portion of each extension from the rest of the body, at least a portion of at least one of the extensions to be at least partially deformed plastically by the portion of the impact energy.

One or more of the extensions may be shaped as a peninsula connected at one end to the body and a remainder of the peninsula being separated from the body by the corresponding gap.

One or more of the extensions may be formed integrally with the body.

The EAD may comprise an at least partially corrugated structure at least partially made of a sheet-like material, the at least partially corrugated structure to be at least partially deformed plastically by the portion of the impact energy.

The EAD may comprise a plastically deformable foam supported by a support member, the foam to be at least partially disposed between the housing and the structural member, the foam to be at least partially deformed plastically by the portion of the impact energy.

The EAD may comprise a first set of mounting points for being coupled to one of the housing and the structural member and a second set of mounting points for being coupled to the other one of the housing and the structural member, the EAD comprising a plastically deformable structure at each of the second set of mounting points.

The deformable structure may comprise one or more of a lattice and a truss.

The powered device may comprise a mower, the actuator may comprise an electric motor, the working member may comprise a cutting blade of the mower, and the structural member may comprise at least a portion of a deck of the mower

BRIEF DESCRIPTION OF THE DRAWINGS

Some example implementations of the present specification will now be described with reference to the attached Figures, wherein.

DETAILED DESCRIPTION

Figure 1:
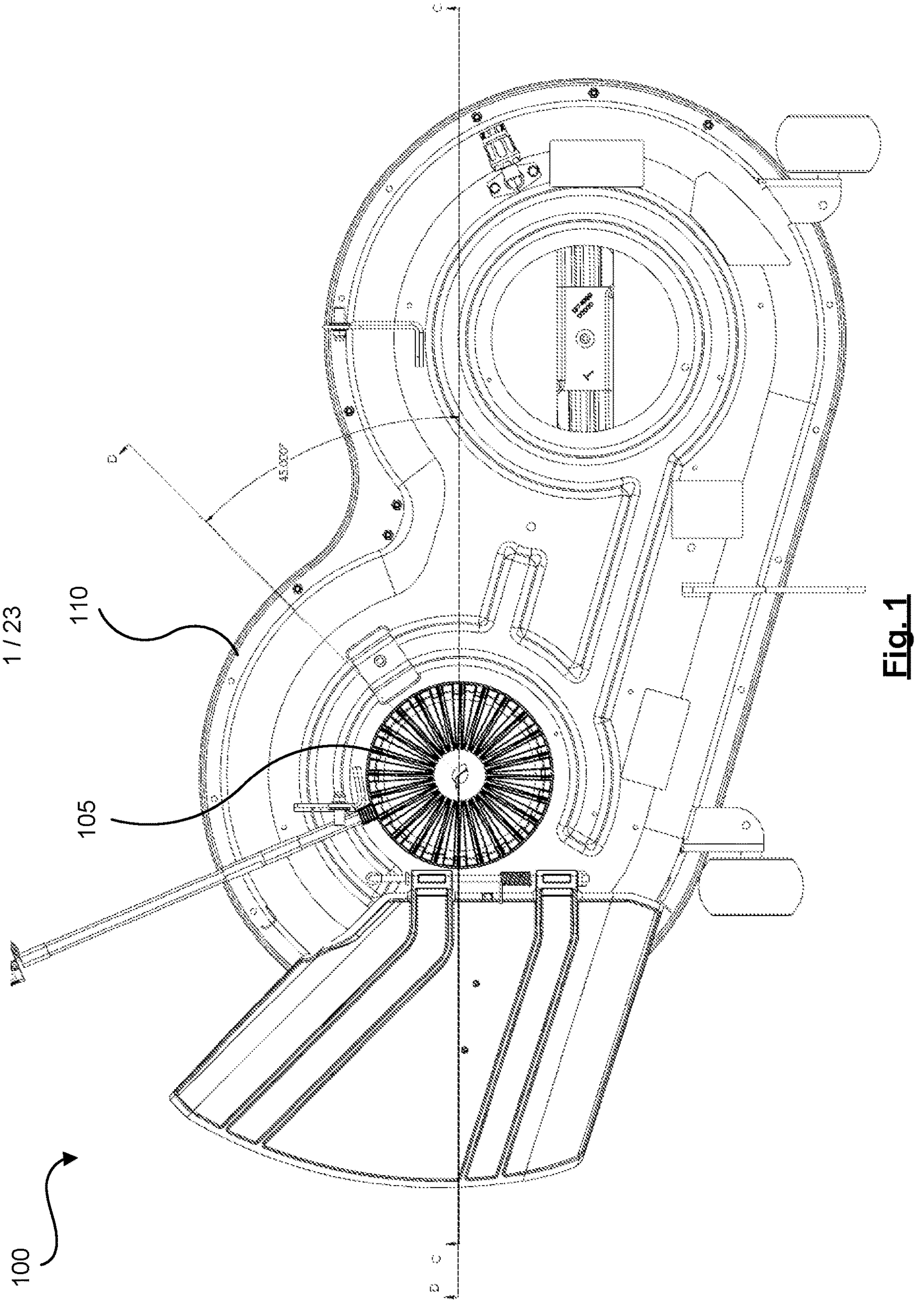
FIG. 1 shows a top plan view of an example deck of an example electric mower, in accordance with a non-limiting implementation of the present specification.

Unless the context requires otherwise, throughout this specification the word “comprise” and variations thereof, such as, “comprises” and “comprising” are to be construed in an open, inclusive sense, that is as “including, but not limited to.”

As used in this specification, the singular forms “a,” “an,” and “the” include plural referents unless the content clearly dictates otherwise. It should also be noted that the term “or” is generally employed in its broadest sense, that is as meaning “and/or” unless the content clearly dictates otherwise.

A powered device may comprise a working member to perform work on objects or environments outside of the powered device. Such a powered device may comprise one or more actuators to actuate its working member. During operation, the working member may strike an obstacle. Such a strike may exert a force on the working member, which may then transmit the force to the actuator or other components of the powered device. This type of force may damage the actuator or other components of the powered device.

Examples of such powered devices may include mowers, snow blowers, and the like. Moreover, examples of actuators may include electric motors, internal combustion engines, and the like. Furthermore, examples of working members may include mower cutting blades, snow auger blades, and the like. For example, an electric mower may comprise an electric motor to actuate a cutting blade of the mower. The motor may comprise a housing, which housing may be coupled to a structural member of the mower. In some examples, the structural member may comprise at least a portion of a deck of the mower. In general, the structural member may comprise a component or portion of the powered device to which the housing is coupled or mounted. In operation, the cutting blade may strike an obstacle such as a post, a stone, and the like. This strike may exert a force on the blade, which blade may then transmit the force to the motor. This force may damage various components of the motor. For example, the force may damage the housing used to mount the motor to the deck.

In order to mitigate the damaging impacts of such a force, an energy absorbing device (EAD) may be used in the powered device to absorb at least a portion of the force. Absorbing a portion of the force may also be described as absorbing a portion of the impact energy of the working member striking the obstacle. In some examples, such an energy absorbing device may absorb the impact energy by becoming plastically deformed. Plastic deformation may also be described as non-elastic deformation.

In the example of the mower, an energy absorbing device may be interposed between the motor housing and the mower deck. The EAD being interposed between the housing and the deck may also be described as the EAD being disposed between the housing and the deck. In operation, if the mower blade strikes an obstacle, at least a portion of the impact energy may be absorbed by the energy absorbing device to plastically deform the energy absorbing device. By absorbing a portion of the impact energy, the energy absorbing device may reduce the impact energy that may damage other components of the motor or the mower, such as a motor housing and the like.

In some cases, the motor housing may react to torsional loads in multiple axes due to the sudden deceleration of the mower blade, and the transmission of a combination of angular momentum and impact loads through the blade, along the shaft, and into the housing. For at least this reason, a simple torque-limiting coupling may not satisfy the requirements for protecting the motor housing from such impact energy. One challenge may be that the rotational energy may be transferred from the primary axis of the mower blade into an arbitrary motion path determined by a combination of the setting of the torsion-limiting capacity of the blade mounting system, the stiffness of the blade, and the stiffness of the object causing the impact event.

The solution provided to this problem by the EAD is thus not to eliminate the movement of the motor and the blade assembly, but rather to reduce the stiffness of the mounting system between the motor housing and the deck by allowing the EAD to deform during an impact event. The off-axis load is still transmitted through the shaft and to the housing, but the loads on the housing are limited by the EAD.

In some examples, the impact and its associated impact energy may cause a sudden reduction in the rotation of the shaft, thereby causing a corresponding counter-rotational force or counter-torque on the shaft and the associated actuator. This counter-rotational torque to force may be about the axis of rotation of the shaft. The axis of rotation may also be described as the rotational axis of the shaft.

In addition to, or instead of, this counter-rotational torque or force, the impact and its associated impact energy may also have a component tending to rotate, translate, or otherwise move the shaft and its associated actuator to deviate from the shaft's pre-impact axis of rotation. This component of the impact energy may be described as an off-axis load.

If the cutter blade does strike an obstacle and the corresponding impact energy does cause a deformation in the energy absorbing device, the energy absorbing device may be replaced. If the energy absorbing device absorbs enough of the impact energy to prevent damage to the other components of the mower, it may not be necessary to replace other, more expensive parts of the mower such as the motor housing or the motor itself.

According to some examples, there is provided a powered device comprising an actuator to power a rotatable shaft coupled to a working member, a housing to house the actuator, a structural member to be coupled to the housing, and an energy absorbing device (EAD). The EAD is disposed between the housing and the structural member. In some examples, the structural member may be couple to housing indirectly, via the EAD. Moreover, the EAD is to absorb at least a portion of an impact energy of the working member striking an obstacle. The EAD is to absorb the portion of the impact energy by being plastically deformed by the portion of the impact energy.

Furthermore, according to some examples, there is provided an EAD for a powered device. The EAD is to be disposed between a housing for an actuator of the powered device and a structural member of the powered device. The actuator is to power a rotatable shaft coupled to a working member. The structural member is to be coupled to the housing. In some examples, the structural member may be couple to housing indirectly, via the EAD. The EAD is to absorb at least a portion of an impact energy of the working member striking an obstacle. Moreover, the EAD is to absorb the portion of the impact energy by being plastically deformed by the portion of the impact energy.

Figure 2:
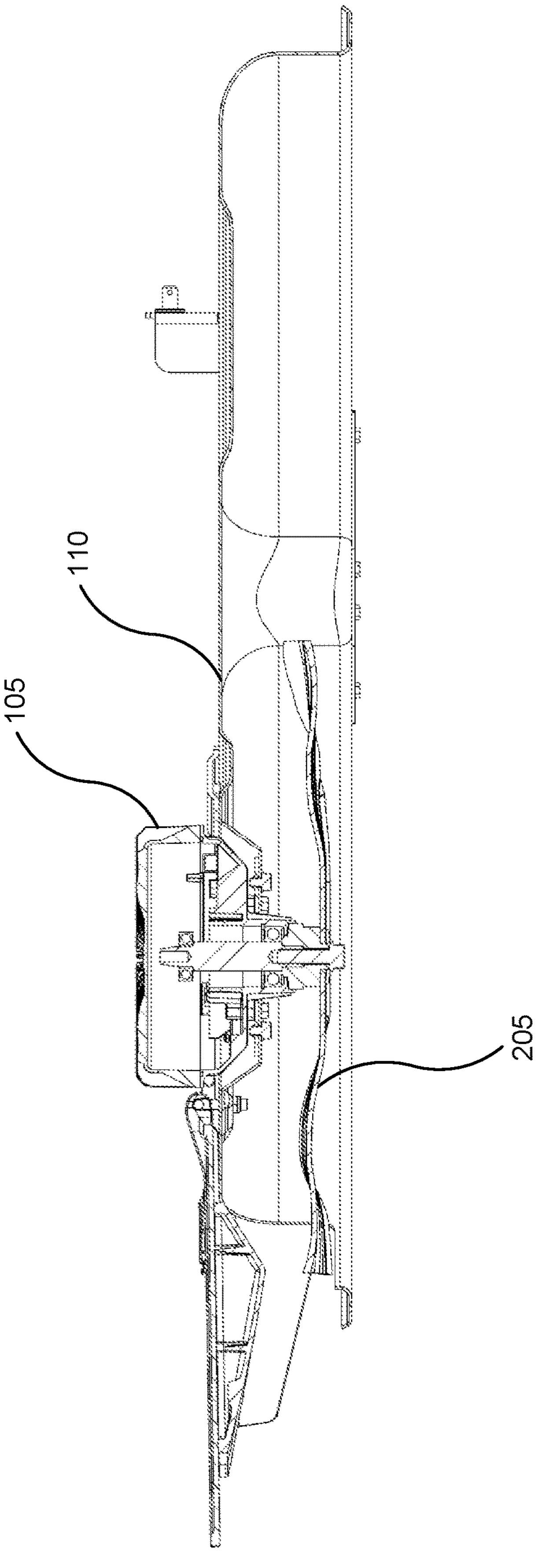
FIG. 2 shows a cross-sectional view of the deck of FIG. 1 taken along line CC shown in FIG. 1.

Examples of the energy absorbing device are described in greater detail in relation to FIGS. 4-6 and 18-23. Turning now to FIG. 1, a top plan view is shown of an example deck 100 of an example electric mower. Deck 100 comprises an electric motor 105 coupled to a deck body 110. FIG. 2 shows a cross-section of deck 100 taken along line CC shown in FIG. 1. FIG. 2 shows a cutting blade 205 coupled to motor 105.

Figure 3:
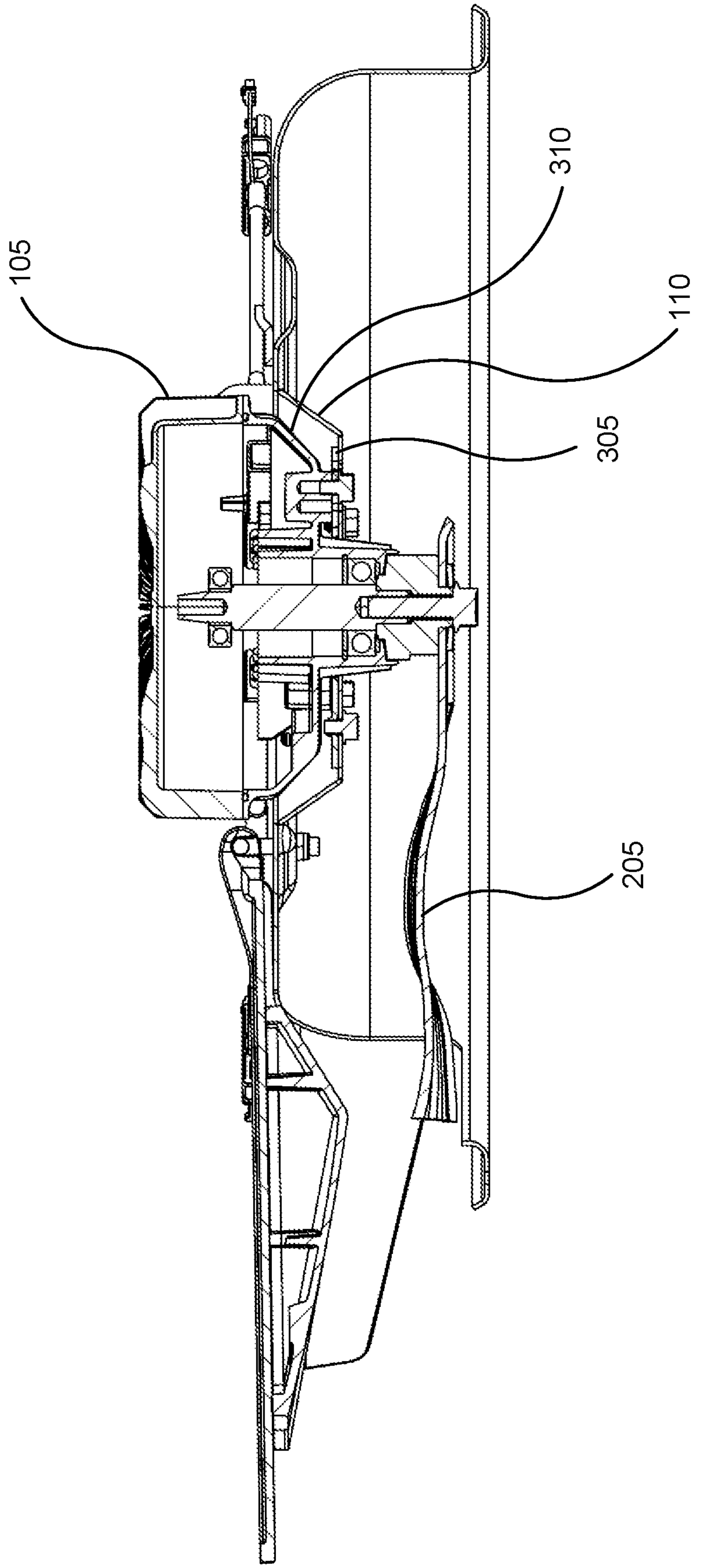
FIG. 3 shows another cross-sectional view of the deck of FIG. 1 taken along line DD shown in FIG. 1.

FIG. 3 shows another cross-section of deck 100 taken along line DD shown in FIG. 1. FIG. 3 shows an example energy absorbing device (EAD) 305 disposed between a housing 310 of motor 105 and deck body 110. In other words, motor 105 is mounted or coupled to deck body 110 by coupling motor housing 310 to EAD 305 and coupling EAD 305 to deck body 110. In this manner, EAD 305 may absorb at least a portion of impact energy that may be generated if blade 205 strikes an obstacle. EAD 305 may absorb the impact energy by becoming plastically deformed. By absorbing at least a portion of the impact energy, EAD 305 may reduce the likelihood of the impact energy damaging the components of deck 100 such as motor housing 310 or deck body 110.

Figure 4:
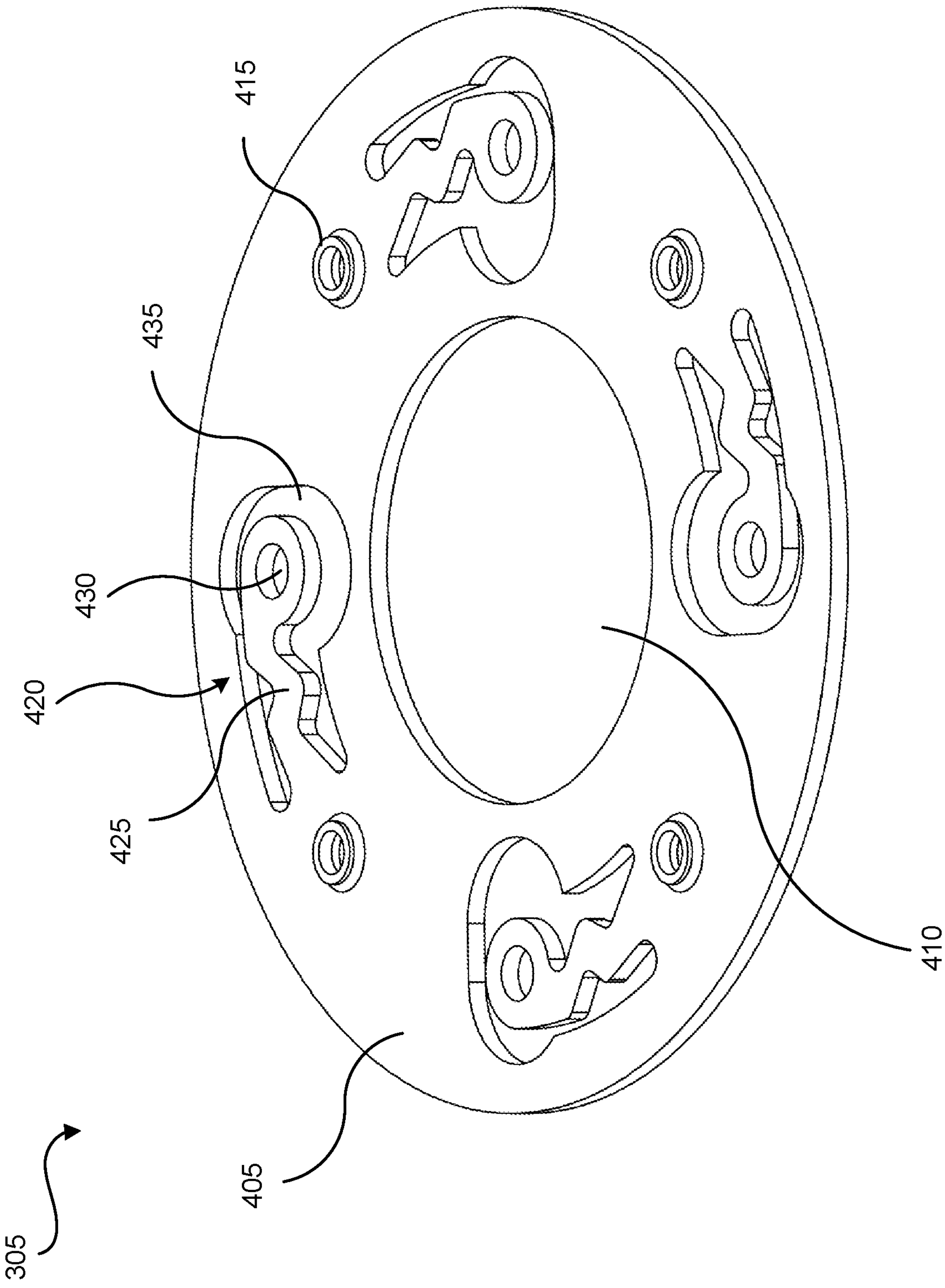
FIG. 4 shows a top perspective view of an example of energy absorbing device (EAD), in accordance with a non-limiting implementation of the present specification.

FIG. 4 shows a top perspective view of EAD 305. EAD 305 comprises an EAD body 405 defining an opening 410. Body 405 and opening 410 together define an annulus. When installed, opening 410 may be used to allow passage of a shaft or other components of the electric motor. In some examples, EAD 305 may comprise a metal such iron, an iron alloy, aluminum, an aluminum alloy, and the like.

EAD 305 comprises a first set of mounting holes 415 in body 405. EAD 305 comprises four mounting holes 415. It is contemplated that in some examples, mounting or coupling modules other than holes may be used. Moreover, in some examples, the number, position, or distribution of the first set of mounting holes may be different than those shown in FIG. 4.

EAD 305 also comprises a second set of mounting modules 420. EAD 305 comprises four mounting modules 420. Each mounting module 420 comprises an extension 425 terminating in a mounting hole 430. A gap 435 separates at least a portion of extension 425 from the rest of body 405. In EAD 305, extension 425 is shaped as a peninsula, connected at one end to body 405 while the remainder of extension 425 is separated from body 405 by gap 435. In EAD 305 extension 425 is formed integrally with body 405. For example, mounting module 420 may be formed by removing portions of body 405 to form hole 430 and gap 435. In some examples, laser cutting may be used to form mounting module 420. It is contemplated that in some examples, other manufacturing techniques may also be used.

It is also contemplated that in some examples, extension 425 may be formed separately from body 405 and then secured to body 405. Hole 430 may also be used for mounting EAD 305 to other components such as the motor housing or the deck body. In some examples, module 420 may comprise a mounting means other than a hole.

Extension 425 may deform in response to an impact energy. The shape of extension 425 may be selected based on the minimum threshold impact force or energy at which extension 425 is to plastically deform to absorb at least a portion of the impact energy. For example, a longer or narrower extension may plastically deform at a relatively lower threshold energy. A shorter or wider extension may plastically deform at a relatively higher threshold energy. It is contemplated that in some examples, other regions of EAD 305 may also plastically deform to absorb some of the impact energy.

Figure 5:
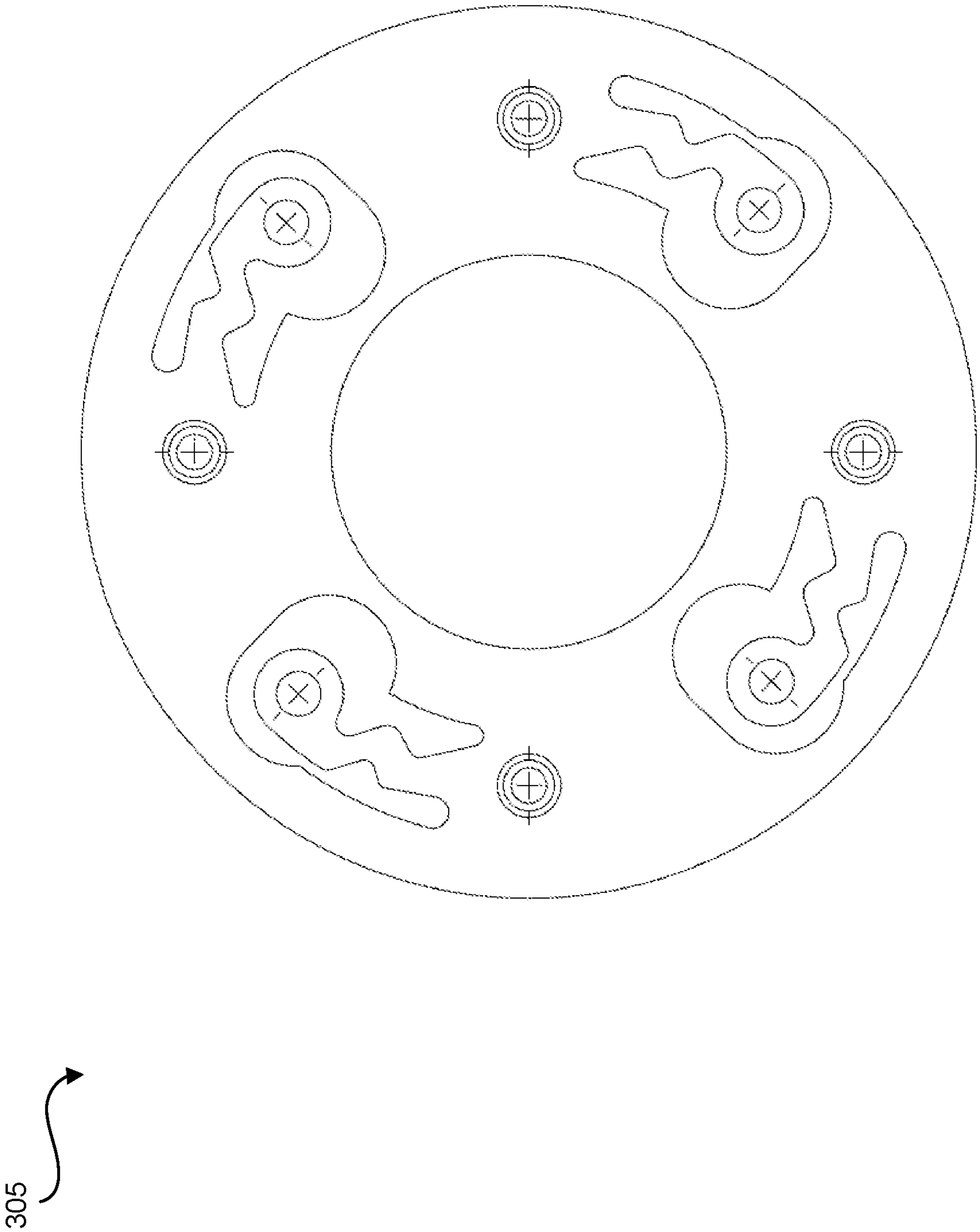
FIG. 5 shows a top plan view of the EAD shown in FIG. 4.
Figure 6:
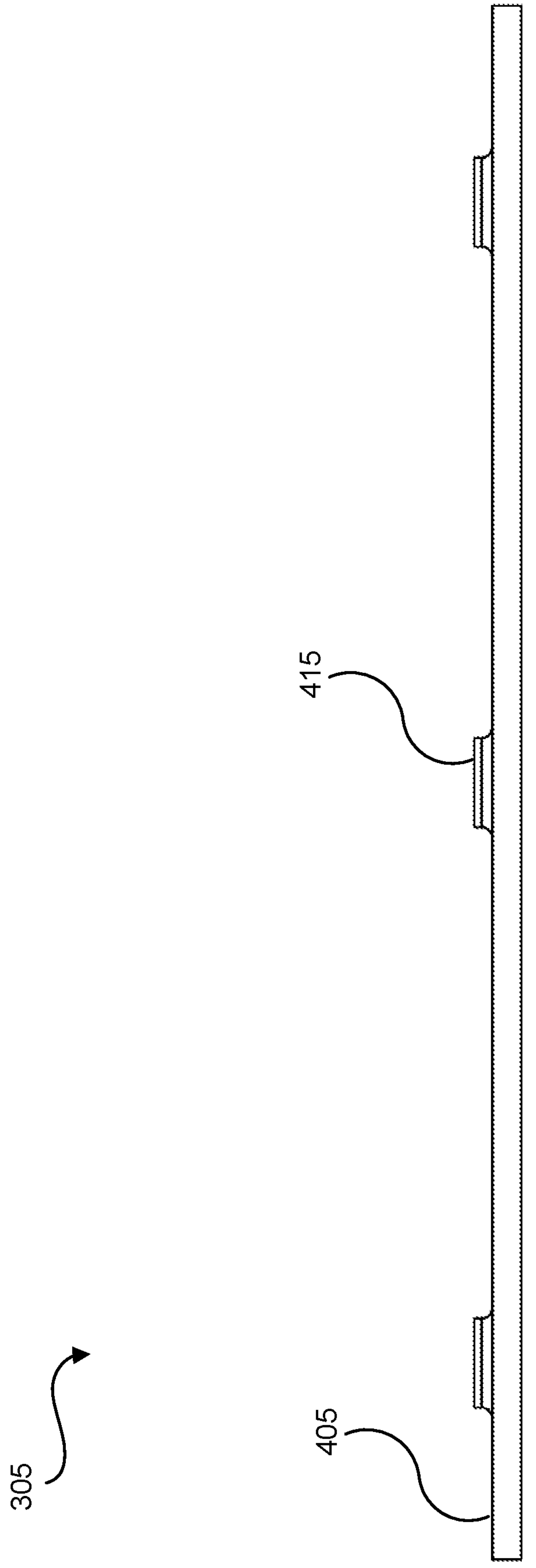
FIG. 6 shows a side elevation view of the EAD shown in FIG. 4.

While FIG. 4 shows EAD 305 as having four mounting modules 420, it is contemplated that in some examples, the EAD may comprise mounting modules that are different in number, shape, size, distribution, and the like. It is also contemplated that in some examples, the body or the opening of the EAD may have a shape other than circular. FIG. 5 shows a top plan view of EAD 305. FIG. 6, in turn, shows a side elevation view of EAD 305.

Figure 7:
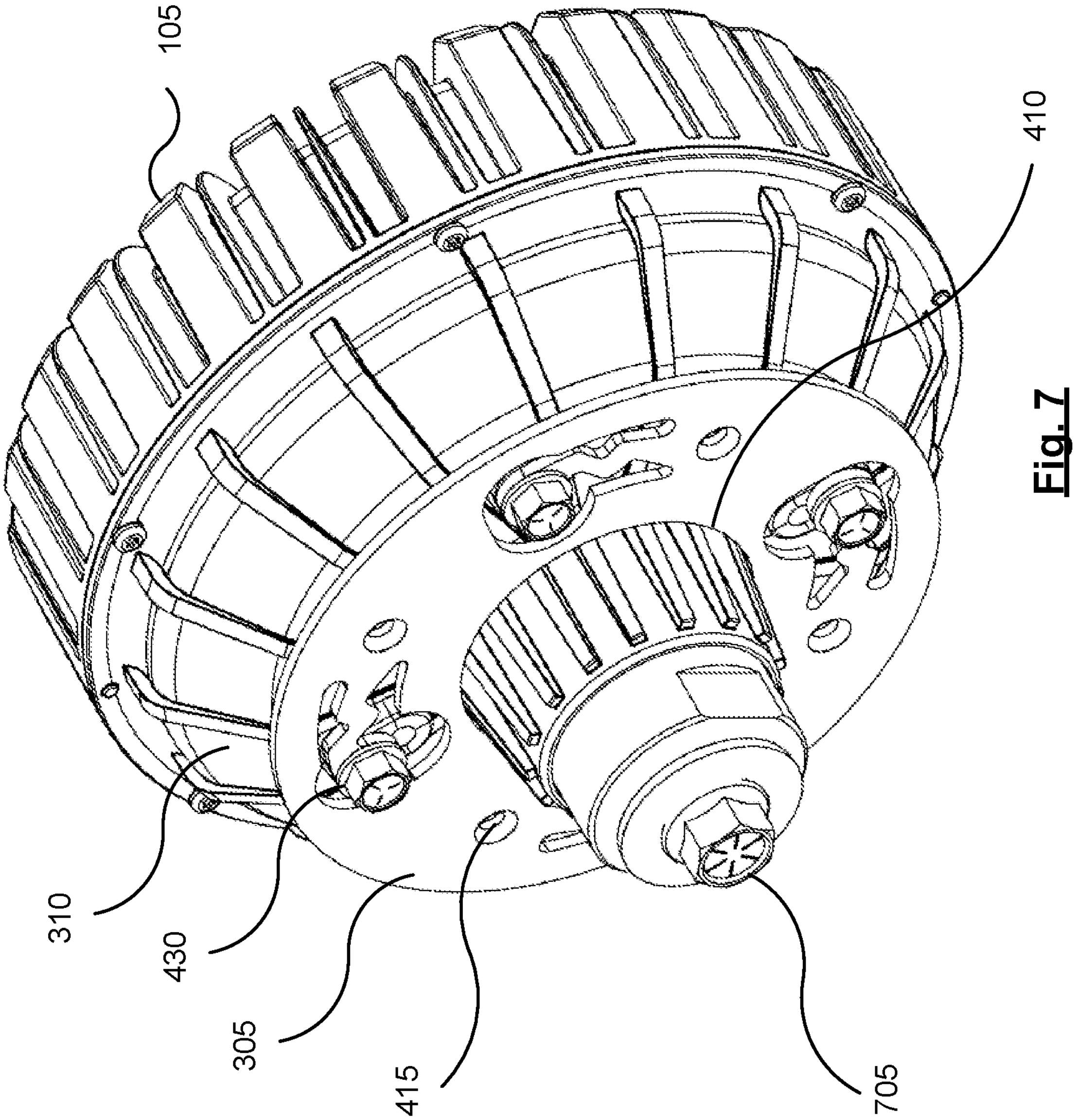
FIG. 7 shows a perspective view of an assembly of the EAD of FIG. 4 coupled to the motor of FIG. 1.

Turning now to FIG. 7, a perspective view is shown of EAD 305 coupled to motor 105. Motor 105 comprises a shaft 705 which extends through opening 410 in the body of EAD 305. Bolts are used to couple housing 310 of motor 105 to EAD 305 via holes 430 of EAD 305. Holes 415 may then be used to couple EAD 305 to a deck body such as body 110 shown in FIG. 1. While FIG. 7 shows motor housing 310 coupled to EAD 305 using holes 430, it is also contemplated that in some examples housing 310 may be coupled to EAD 305 using holes 415, leaving holes 430 to be used for coupling EAD 305 to the mower deck body.

Figure 8:
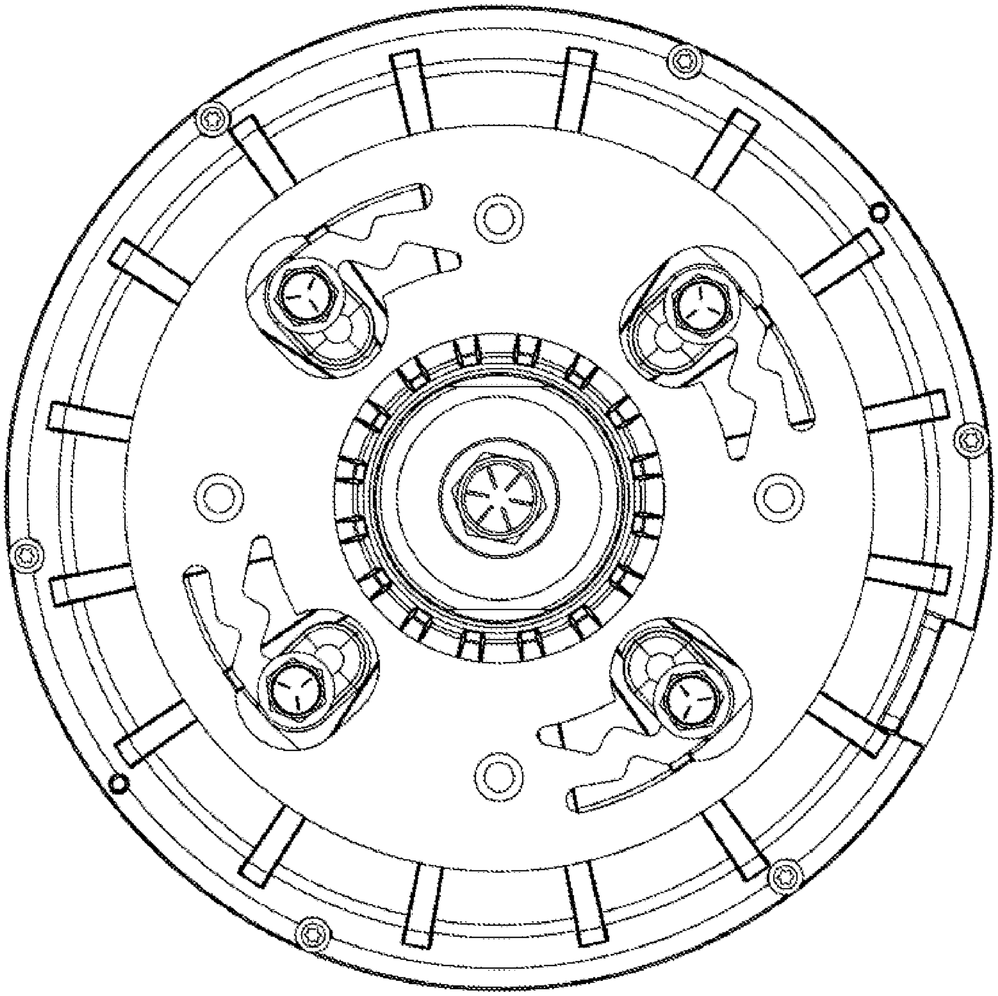
FIG. 8 shows a bottom plan view of the assembly of FIG. 7.
Figure 9:
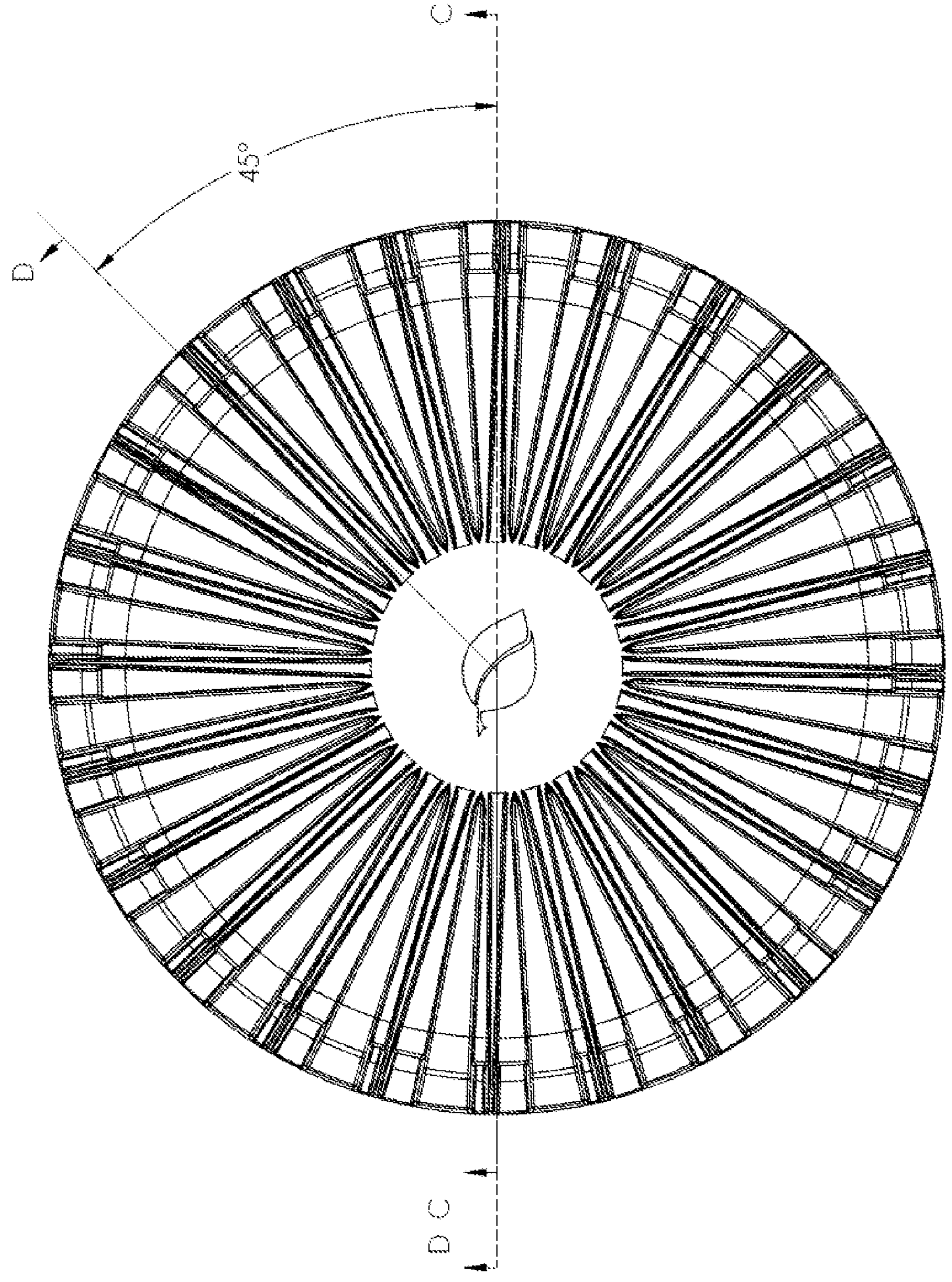
FIG. 9 shows a top plan view of the assembly of FIG. 7.
Figure 10:
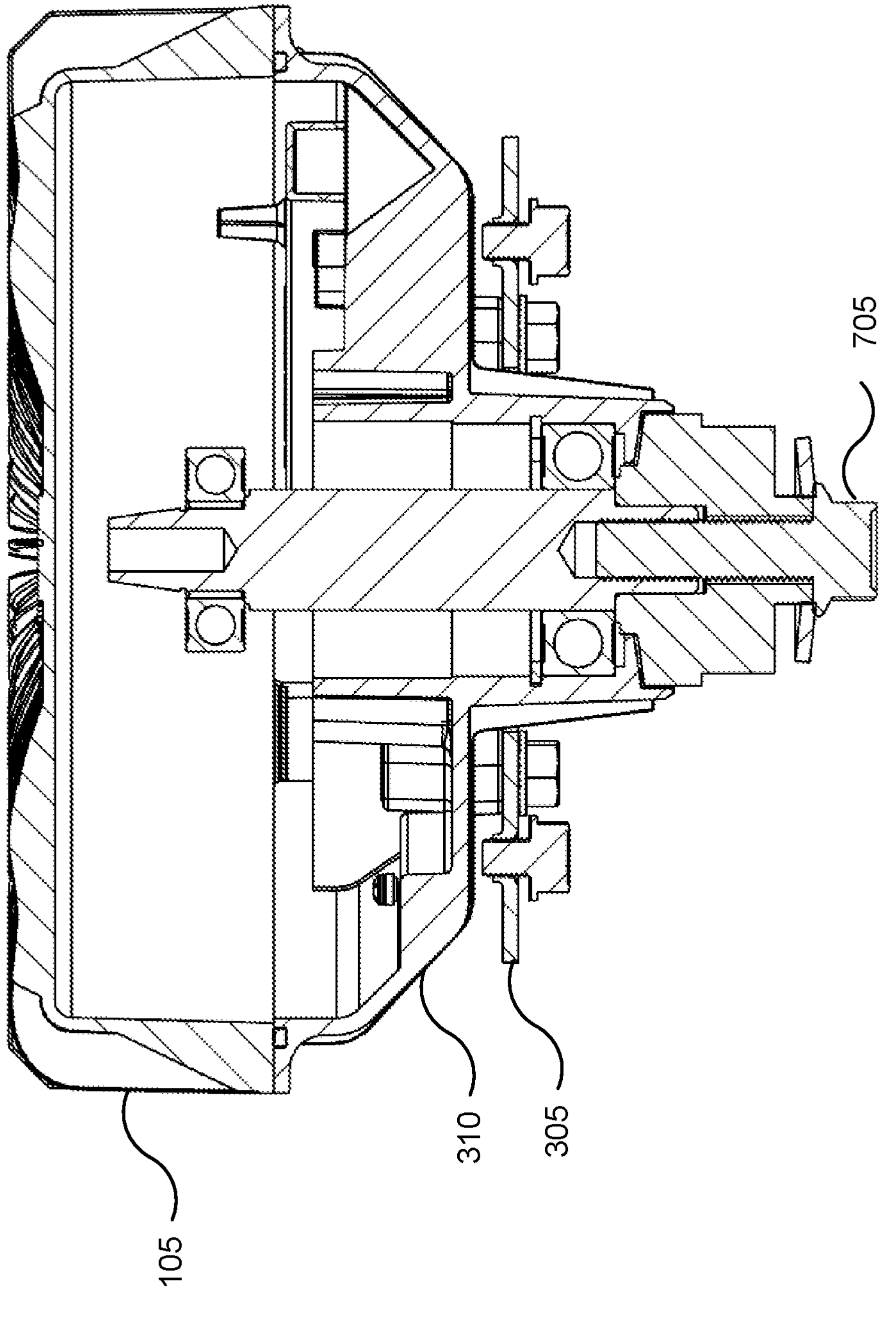
FIG. 10 shows a cross-sectional view of the assembly of FIG. 7 taken along line CC shown in FIG. 9.
Figure 11:
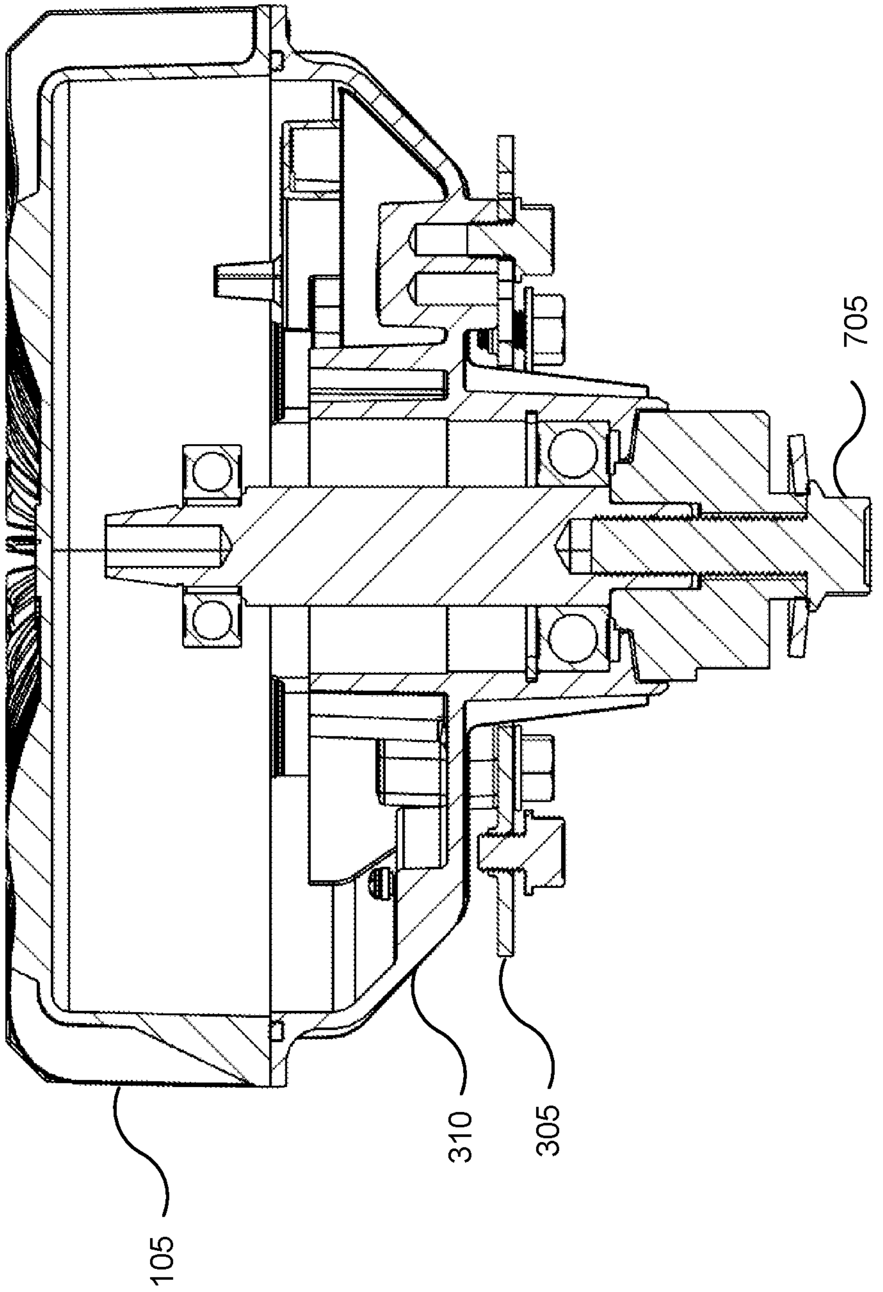
FIG. 11 shows another cross-sectional view of the assembly of FIG. 7 taken along line DD shown in FIG. 9.

FIG. 8 shows a bottom plan view of the EAD and motor assembly shown in FIG. 7. FIG. 9, in turn, shows a top plan view of the EAD and motor assembly shown in FIG. 7. FIG. 10 shows a cross-sectional view of the EAD and motor assembly taken along line CC shown in FIG. 9. FIG. 11, in turn, shows a cross-sectional view of the EAD and motor assembly taken along line DD shown in FIG. 9. Moreover, FIG. 12 shows another top plan view of deck 100, with motor 105 removed to reveal EAD 305 coupled to deck body 110.

Figure 12:
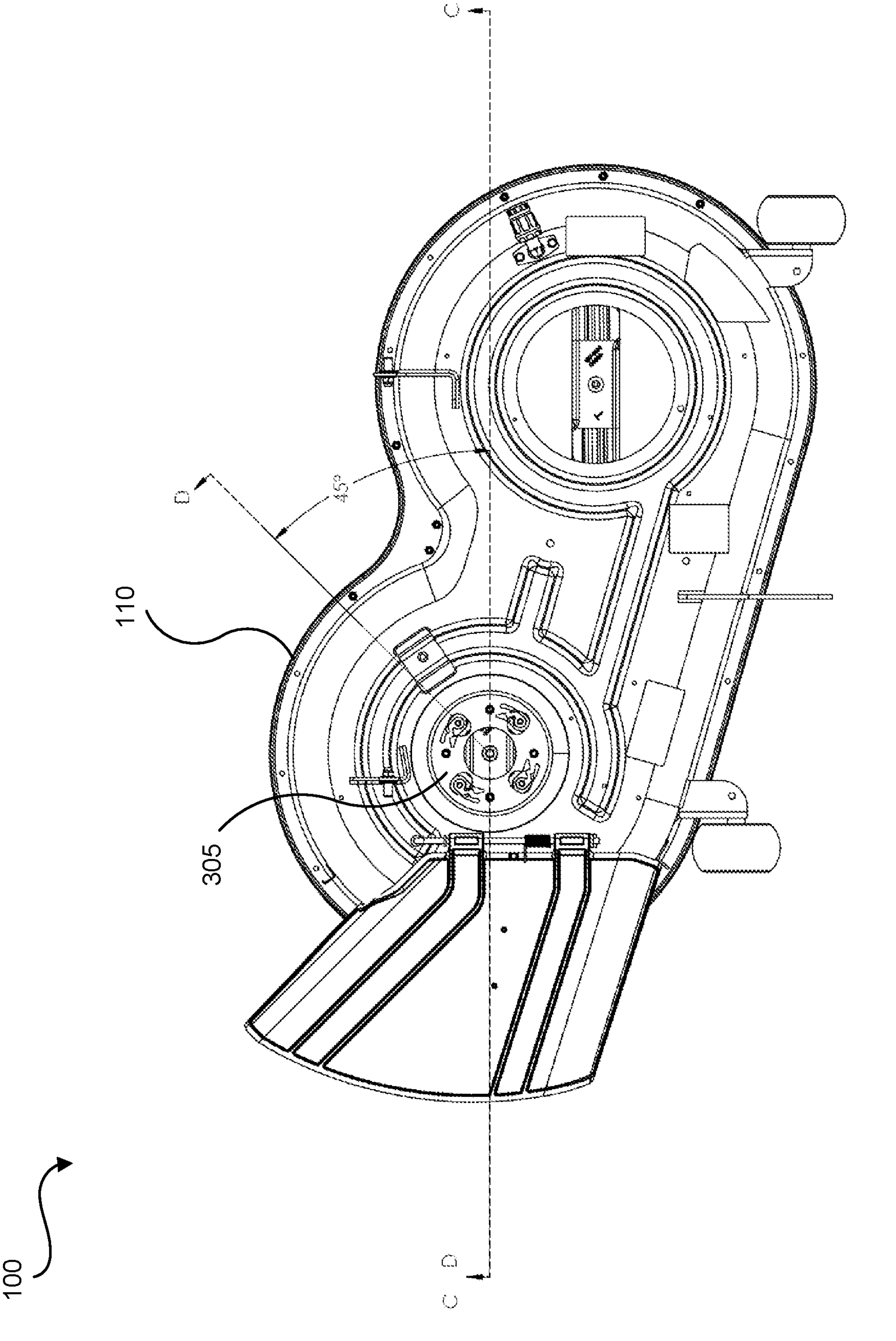
FIG. 12 shows another top plan view of the deck of FIG. 1, with the motor removed to reveal the EAD.
Figure 13:
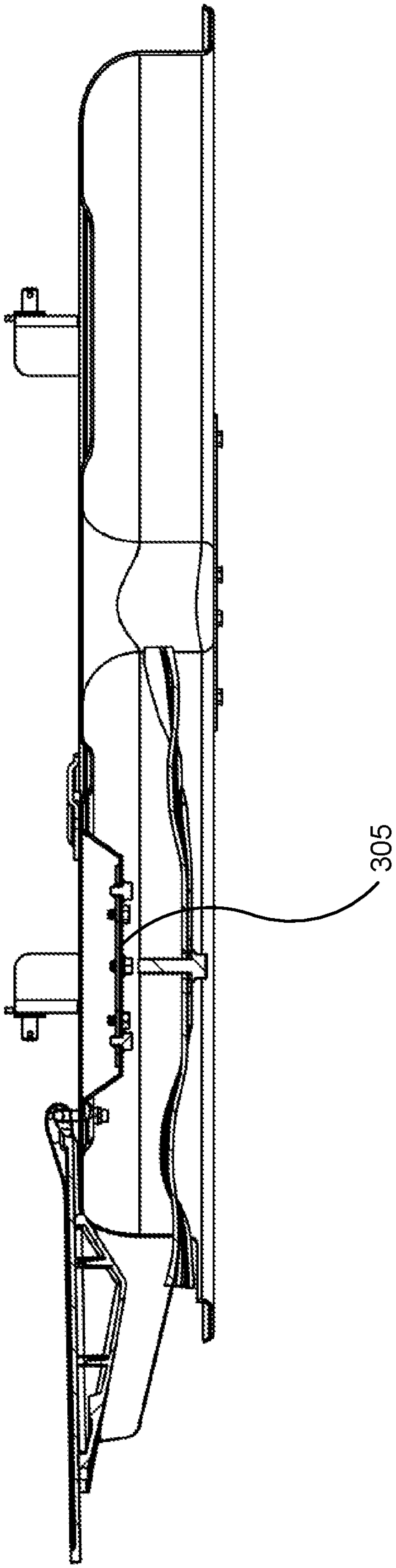
FIG. 13 shows a cross-sectional view of the deck of FIG. 12 taken along line CC shown in FIG. 12.
Figure 14:
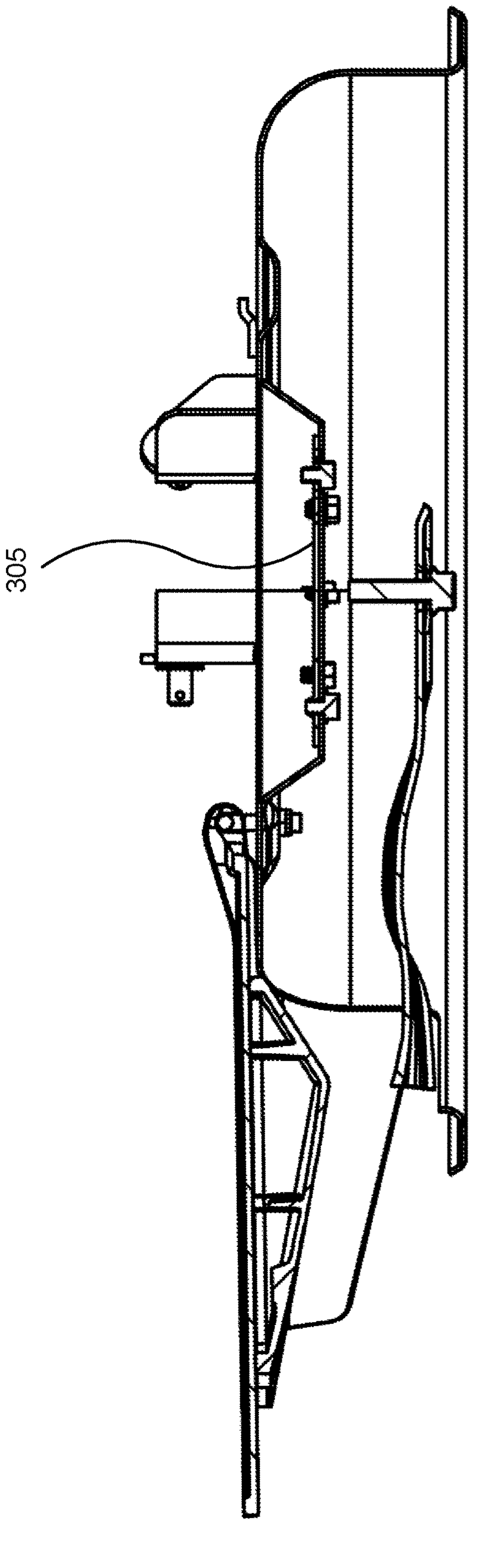
FIG. 14 shows another cross-sectional view of the deck of FIG. 12 taken along line DD shown in FIG. 12.

FIG. 13 shows a cross-section of deck 100, with motor 105 removed, taken along line CC shown in FIG. 12. FIG. 14 shows a cross-section of deck 100, with motor 105 removed, taken along line DD shown in FIG. 12.

Figure 15:
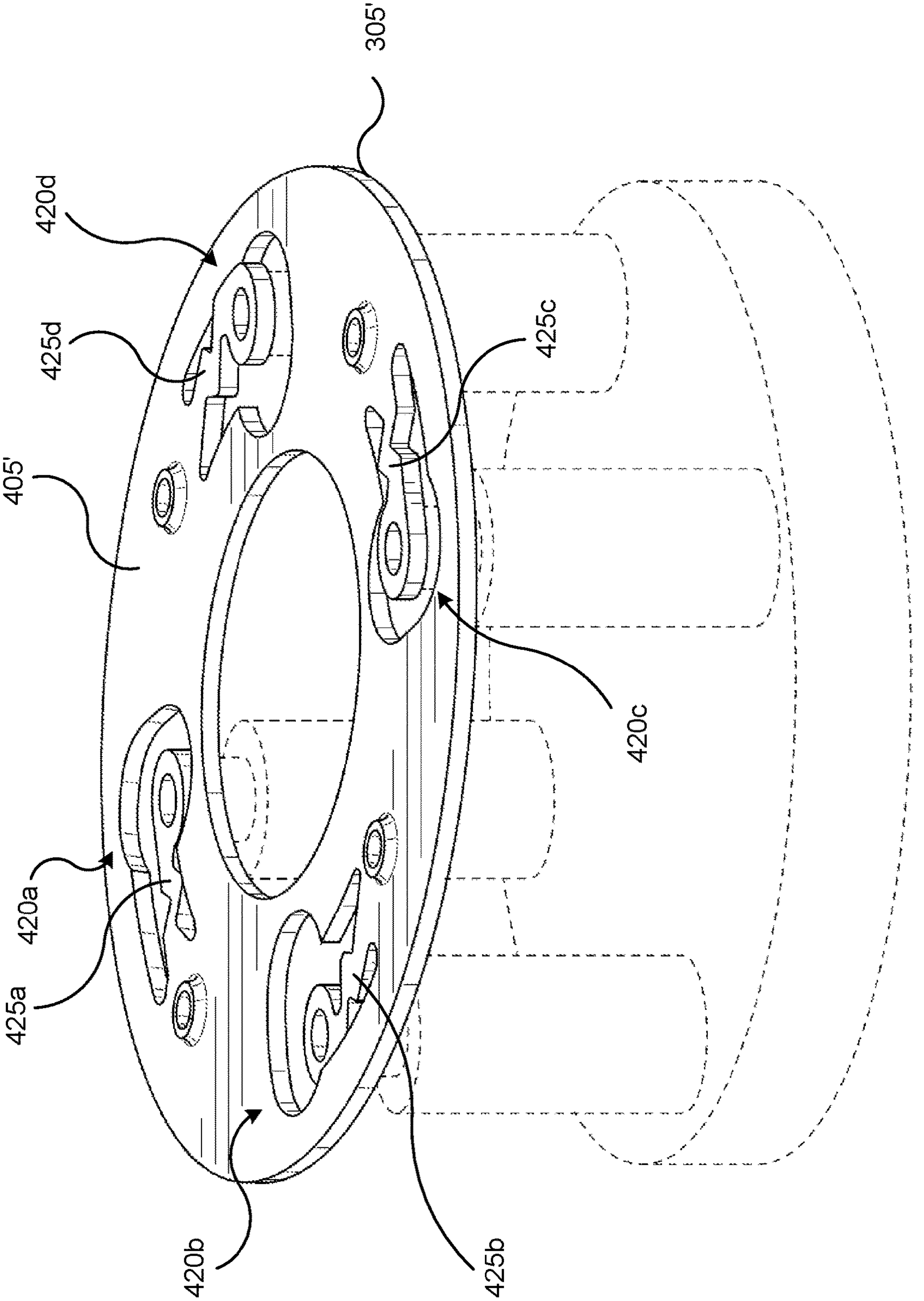
FIG. 15 shows a top perspective view of an example EAD, in accordance with a non-limiting implementation of the present specification.

Turning now to FIG. 15, a perspective view is shown of an example EAD 305'. EAD 305' is similar to EAD 305, with a difference being that EAD 305' has been plastically deformed as a result of absorbing impact energy. EAD 305' comprises a body 405' and mounting modules **420*a*, 420*b*, 420*c*, and 420*d*, each of which comprises an extension 425*a*, 425*b*, 425*c*, and 425*d* respectively. Relative to EAD 305 shown in FIG. 4, in EAD 305' extensions 425*a* and 425*b* have been deformed by being moved out of the plane of body 405' in a first direction, and extensions 425*c* and 425*d* have been deformed by being moved out of the plane of body 405'** in a second direction opposite the first direction.

In FIG. 15 the structures shown in dashed lines are for illustrative purposes, and do not represent a part of the drawing. The dashed pillars may represent coupling or mounting points to a motor housing or a deck body.

Figure 16:
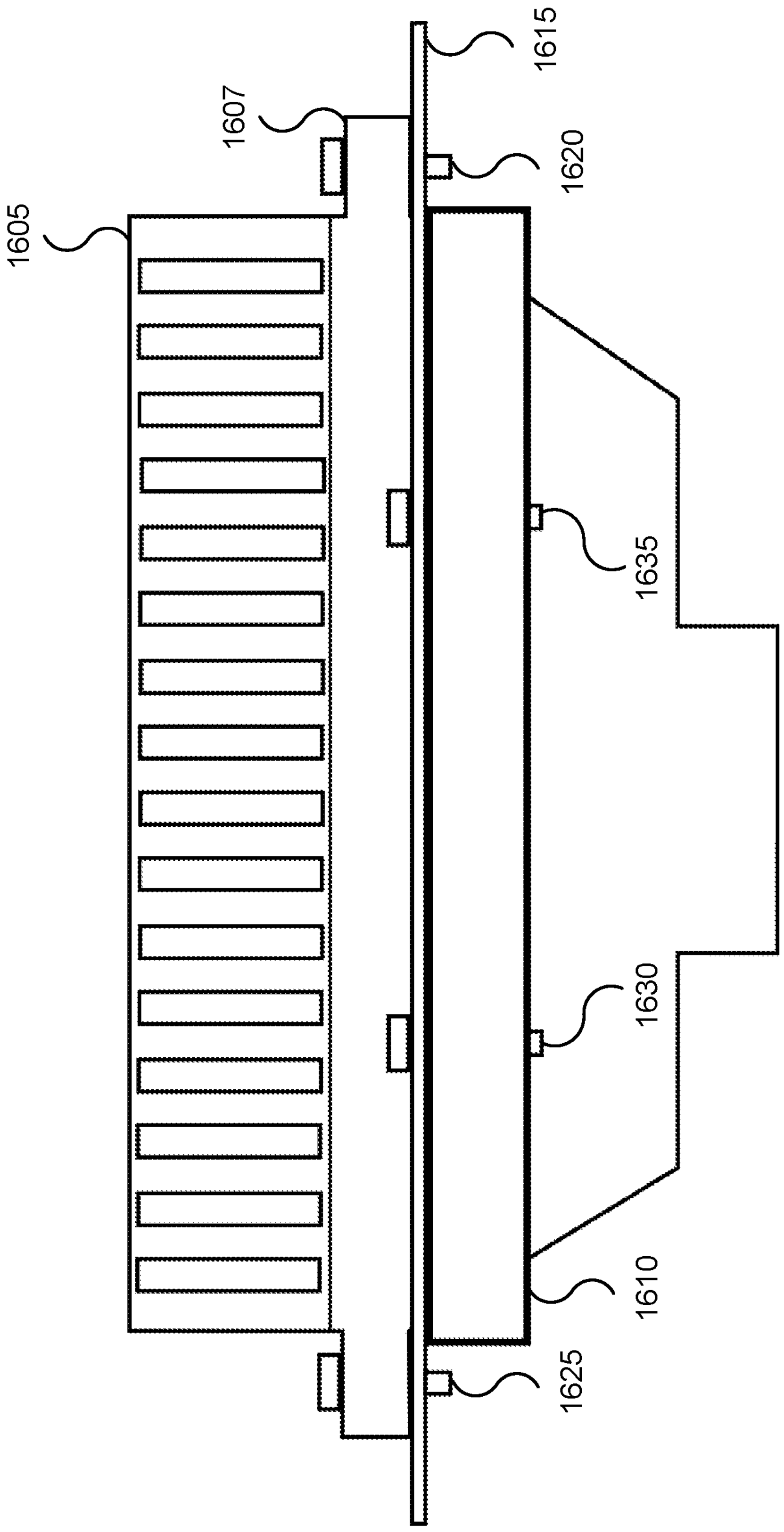
FIG. 16 shows a schematic side elevation view of an example assembly of an example motor and an example deck body, in accordance with a non-limiting implementation of the present specification.

FIG. 16 shows a schematic side elevation view of a motor 1605 and deck body 1610 assembly. In some examples, motor 1605 and deck body 1610 may be similar in structure or function to motor 105 and deck body 110 respectively. Motor 1605 has a housing 1607. An EAD 1615 is disposed between housing 1607 and body 1610. EAD 1615 may comprise a sheet-like structure cut or otherwise formed info a given shape or pattern. In some examples, EAD 1615 may comprise EAD 305. Housing 1607 is coupled to EAD 1615 using bolts 1620 and 1625. Body 1610 is coupled to EAD 1615 using bolts 1630 and 1635. It is contemplated that in some examples, instead of or in addition to one or more of bolts 1620, 1625, 1630, and 1635, other bolts or other types of fasteners may also be used.

Figure 17:
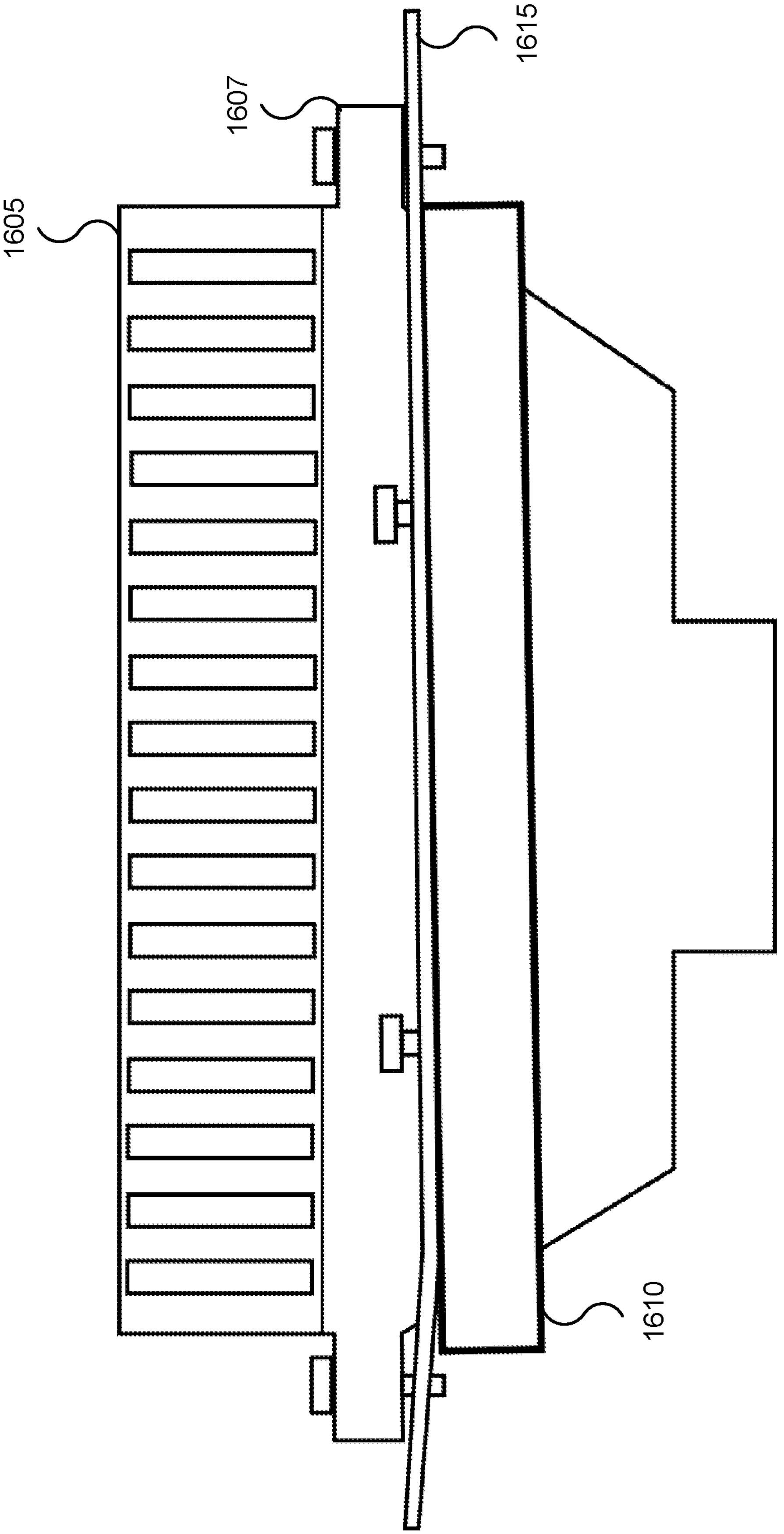
FIG. 17 shows a schematic side elevation view of the assembly of FIG. 16 after having been exposed to an impact force or energy.

FIG. 17 shows another schematic side elevation view of motor 1605 and deck body 1610 assembly. FIG. 17 is similar to FIG. 16, with a difference being that in FIG. 17 EAD 1615 has been plastically deformed as a resulting of absorbing impact energy. An impact energy tending to move motor 1605 relative to body 1610 may be at least partially absorbed by EAD 1615. By absorbing at least some of this impact energy, EAD 1615 reduces the likelihood of the impact energy damaging motor 1605 or body 1610.

Figure 18:
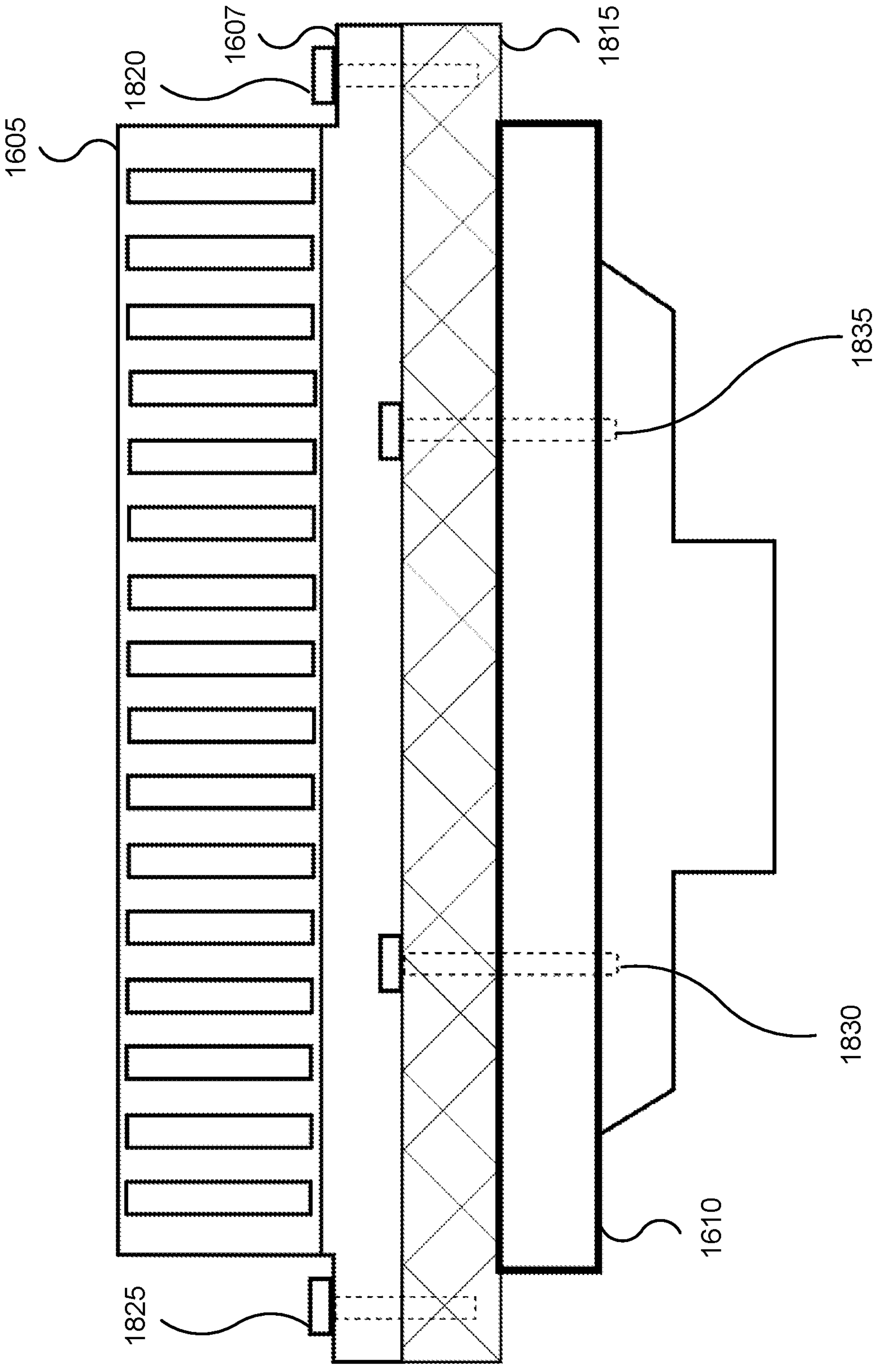
FIG. 18 shows a schematic side elevation view of another example assembly of an example motor and an example deck body, in accordance with a non-limiting implementation of the present specification.

FIG. 18 shows a schematic side elevation view of another example assembly of motor 1605 and deck body 1610. Motor 1605 has housing 1607. An EAD 1815 is disposed between housing 1607 and body 1610. EAD 1815 may comprise a corrugated structure made of a sheet-like material. In some examples, EAD 1815 may comprise a material such as a metal, metal alloy, or the like. Housing 1607 is coupled to EAD 1815 using bolts 1820 and 1825. Body 1610 is coupled to EAD 1815 using bolts 1830 and 1835. It is contemplated that in some examples, instead of or in addition to one or more of bolts 1820, 1825, 1830, and 1835, other bolts or other types of fasteners may also be used.

Figure 19:
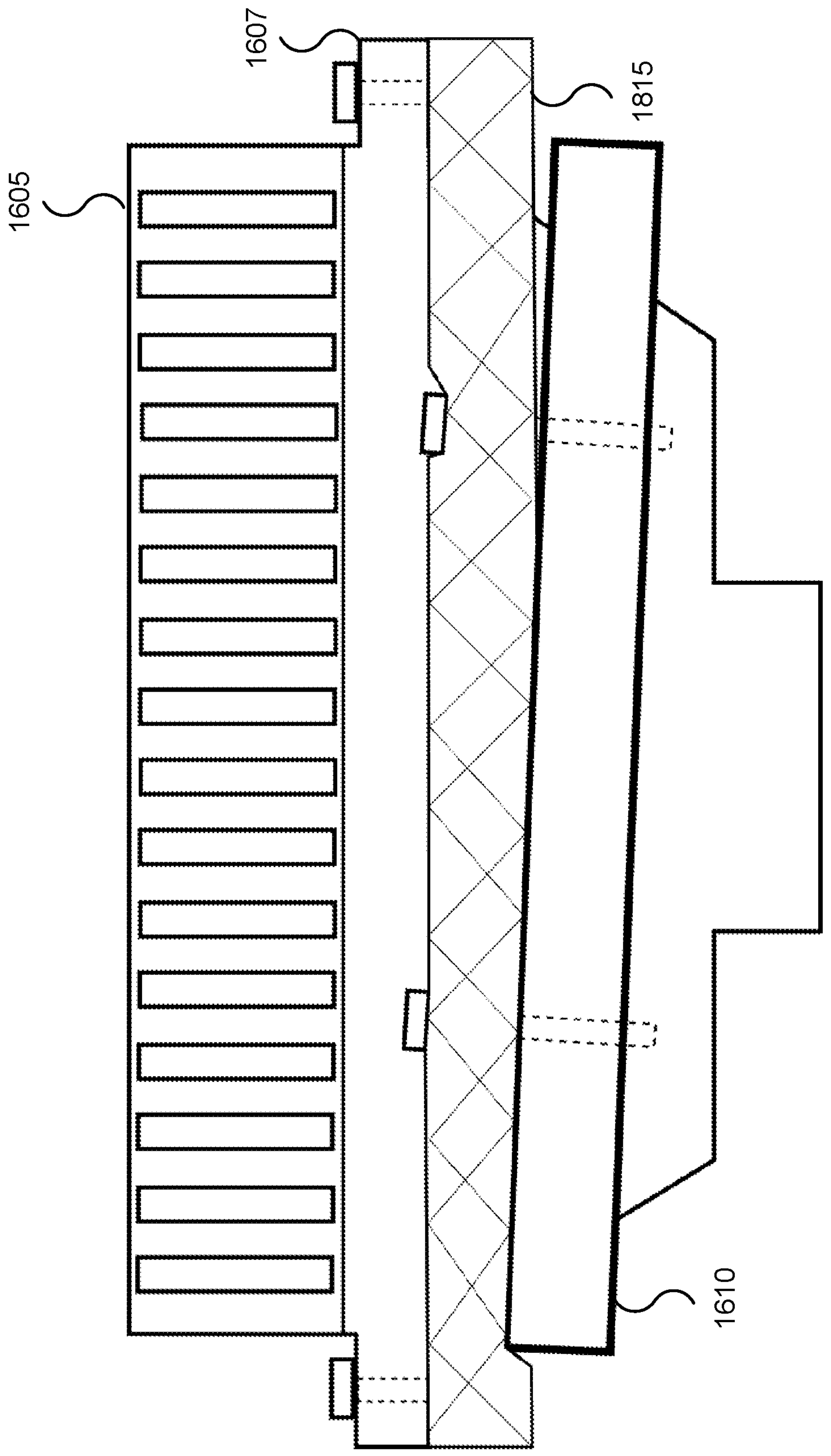
FIG. 19 shows a schematic side elevation view of the assembly of FIG. 18 after having been exposed to an impact force or energy.

FIG. 19 shows another schematic side elevation view of motor 1605 and deck body 1610 assembly. FIG. 19 is similar to FIG. 18, with a difference being that in FIG. 19 EAD 1815 has been plastically deformed as a result of absorbing impact energy. An impact energy tending to move motor 1605 relative to body 1610 may be at least partially absorbed by EAD 1815. By absorbing at least some of this impact energy, EAD 1815 reduces the likelihood of the impact energy damaging motor 1605 or body 1610.

Figure 20:
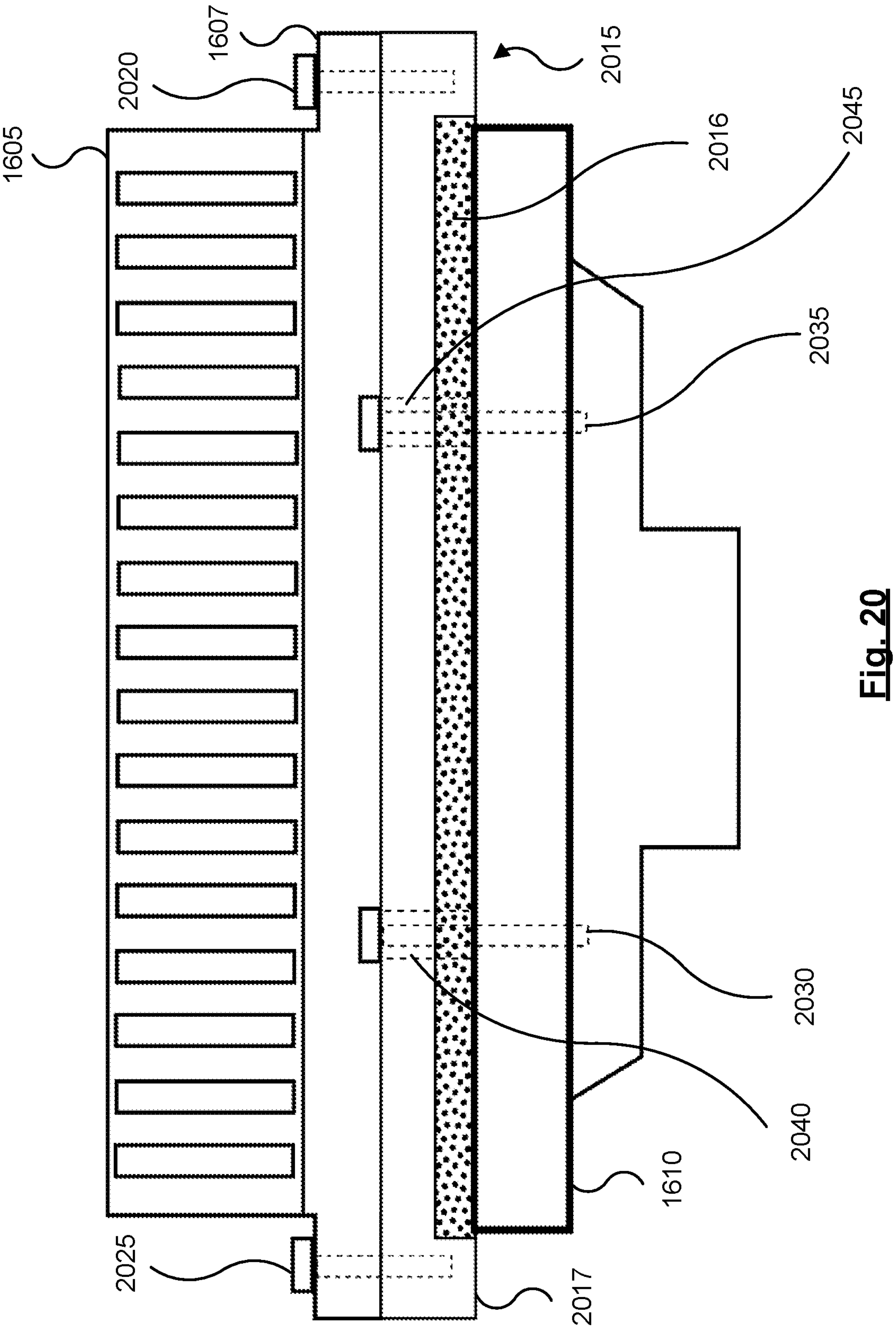
FIG. 20 shows a schematic side elevation view of yet another example assembly of an example motor and an example deck body, in accordance with a non-limiting implementation of the present specification.

FIG. 20 shows a schematic side elevation view of another example assembly of motor 1605 and deck body 1610. Motor 1605 has housing 1607. An EAD 2015 is disposed between housing 1607 and body 1610. EAD 2015 may comprise a crushable or deformable metal structure 2016 supported by a support member 2017. In some examples, metal structure 2016 may comprise a foam or other porous structure. Housing 1607 is coupled to support member 2017 using bolts 2020 and 2025. Body 1610 is coupled to EAD 2015 using bolts 2030 and 2035. Body 1610 abuts metal structure 2016. While FIG. 20 shows housing 1607 coupled to support member 2017 and body 1610 abutting metal structure 2016, it is contemplated that in some examples the orientation of EAD 2015 relative to body 1610 and housing 1607 may be different such that body 1610 may be coupled to support member 2017 and housing 1607 may abut metal structure 2016.

It is contemplated that in some examples, instead of or in addition to one or more of bolts 2020, 2025, 2030, and 2035, other bolts or other types of fasteners may also be used. Bolts 2030 and 2035 pass through respective bolts holes in support member 2017, which bolt holes are larger than the diameter of bolts 2030 and 2035. In other words, there are clearances 2040 and 2045 respectively between bolts 2030 and 2035 and their corresponding bolt holes in support member 2017. Clearances 2040 and 2045 allow for relatively more of an impact energy to be transmitted between body 1610 and metal structure 2016. In the absence of clearances 2040 and 2045, relatively more of the impact energy would be transmitted directly between body 1610 and housing 1607 and would bypass metal structure 2016.

Figure 21:
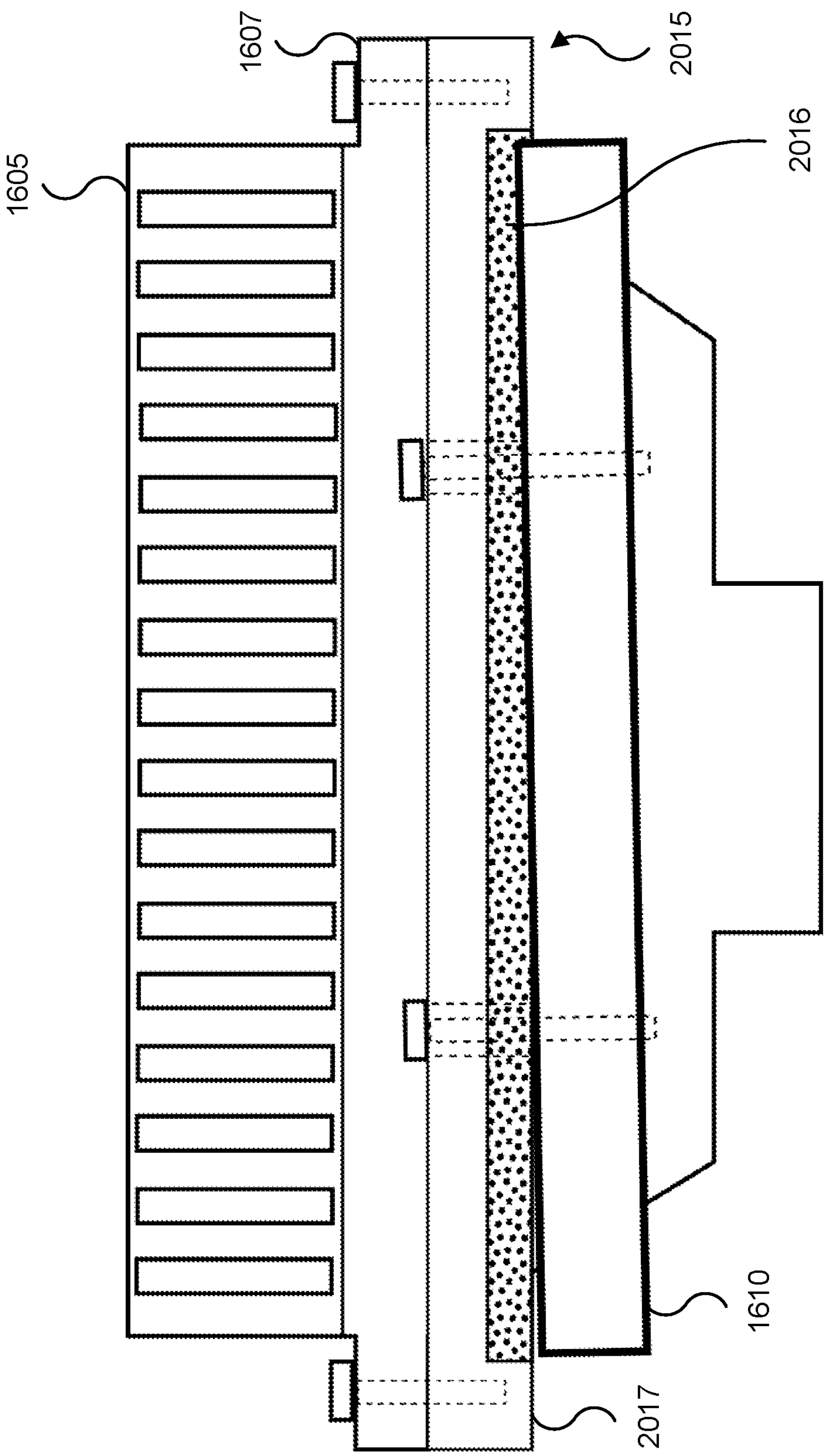
FIG. 21 shows a schematic side elevation view of the assembly of FIG. 20 after having been exposed to an impact force or energy.

FIG. 21 shows yet another schematic side elevation view of motor 1605 and deck body 1610 assembly. FIG. 21 is similar to FIG. 20, with a difference being that in FIG. 21 EAD 2015 has been plastically deformed as a result of absorbing impact energy. In particular, metal structure 2016 portion of EAD 2015 has been plastically deformed by the impact energy. An impact energy tending to move motor 1605 relative to body 1610 may be at least partially absorbed by EAD 2015. By absorbing at least some of this impact energy, EAD 2015 reduces the likelihood of the impact energy damaging motor 1605 or body 1610.

Figure 22:
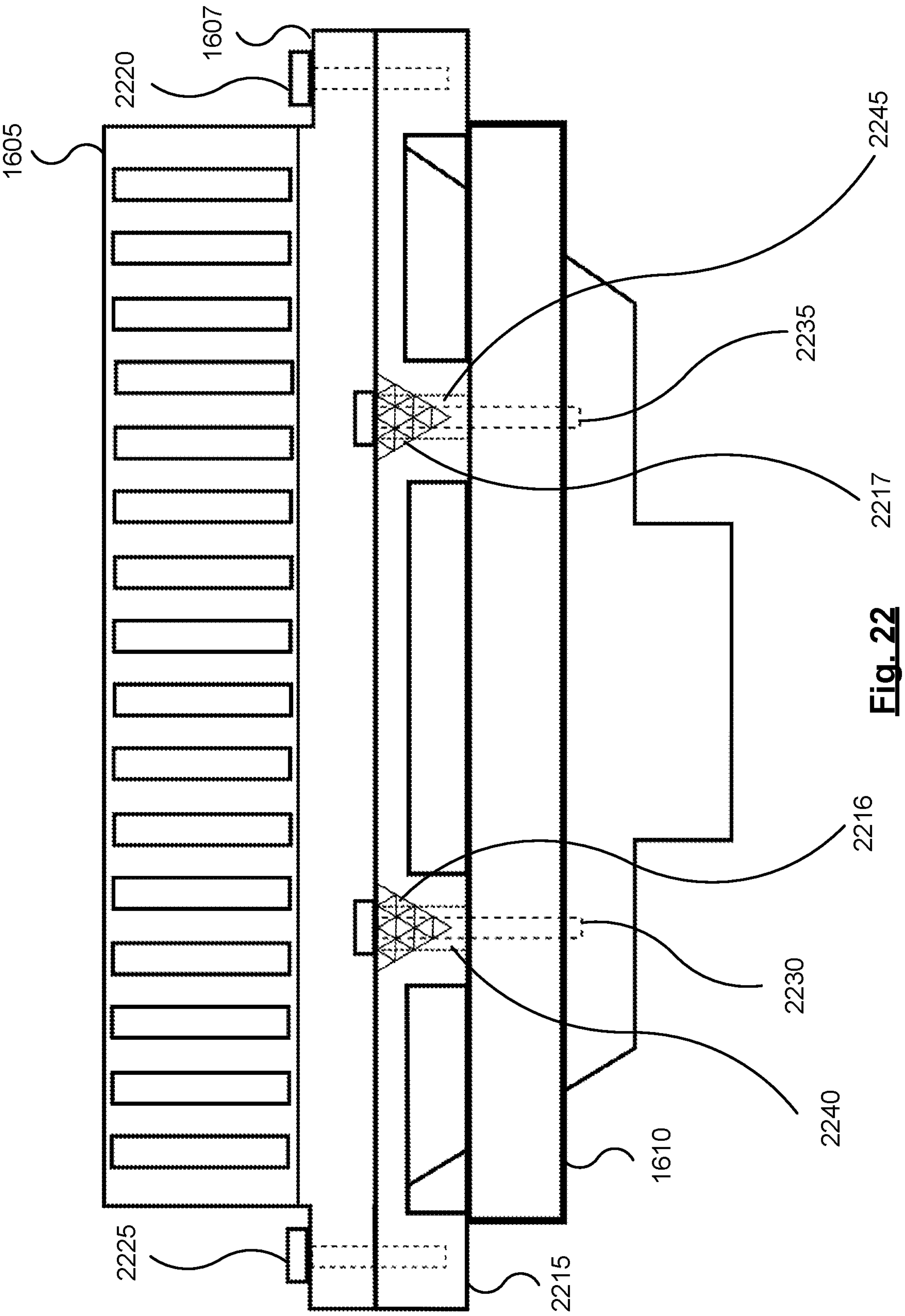
FIG. 22 shows a schematic side elevation view of yet another example assembly of an example motor and an example deck body, in accordance with a non-limiting implementation of the present specification.

FIG. 22 shows a schematic side elevation view of yet another example assembly of motor 1605 and deck body 1610. Motor 1605 has housing 1607. An EAD 2215 is disposed between housing 1607 and body 1610. EAD 2215 comprises crushable or deformable structures 2216 and 2217 at mounting points where EAD 2215 is mounted or coupled to body 1610. In some examples, EAD 2215 may be injection molded using an injection-moldable material such as a plastic, and the like. Moreover, in some examples, structures 2216 and 2217 may comprise lattice or truss structures designed to be crushed for plastically deformed by an impact energy tending to move motor 1605 relative to body 1610 of a mower deck.

Housing 1607 is coupled to EAD 2215 using bolts 2220 and 2225. Body 1610 is coupled to EAD 2215 using bolts 2230 and 2235. It is contemplated that in some examples, instead of or in addition to one or more of bolts 2220, 2225, 2230, and 2235, other bolts or other types of fasteners may also be used. Furthermore, while FIG. 22 shows housing 1607 coupled to EAD 2215 and body 1610 coupled to EAD 2215 at regions of EAD 2215 comprising structures 2216 and 2217, it is contemplated that in some examples the orientation of EAD 2215 relative to body 1610 and housing 1607 may be different such that body 1610 may be coupled to EAD 2215 and housing 1607 may be coupled to EAD 2215 at regions of EAD 2215 comprising structures 2216 and 2217.

Bolts 2230 and 2235 pass through respective bolt holes in EAD 2215, which bolt holes are larger than the diameter of bolts 2230 and 2235. In other words, there are clearances 2240 and 2245 respectively between bolts 2230 and 2235 and their corresponding bolt holes in EAD 2215. Clearances 2240 and 2245 allow for relatively more of an impact energy to be transmitted between body 1610 and structures 2216 and 2217. In the absence of clearances 2240 and 2245, relatively less of the impact energy would be transmitted to structures 2216 and 2217 designed to absorb at least some of that impact energy.

Figure 23:
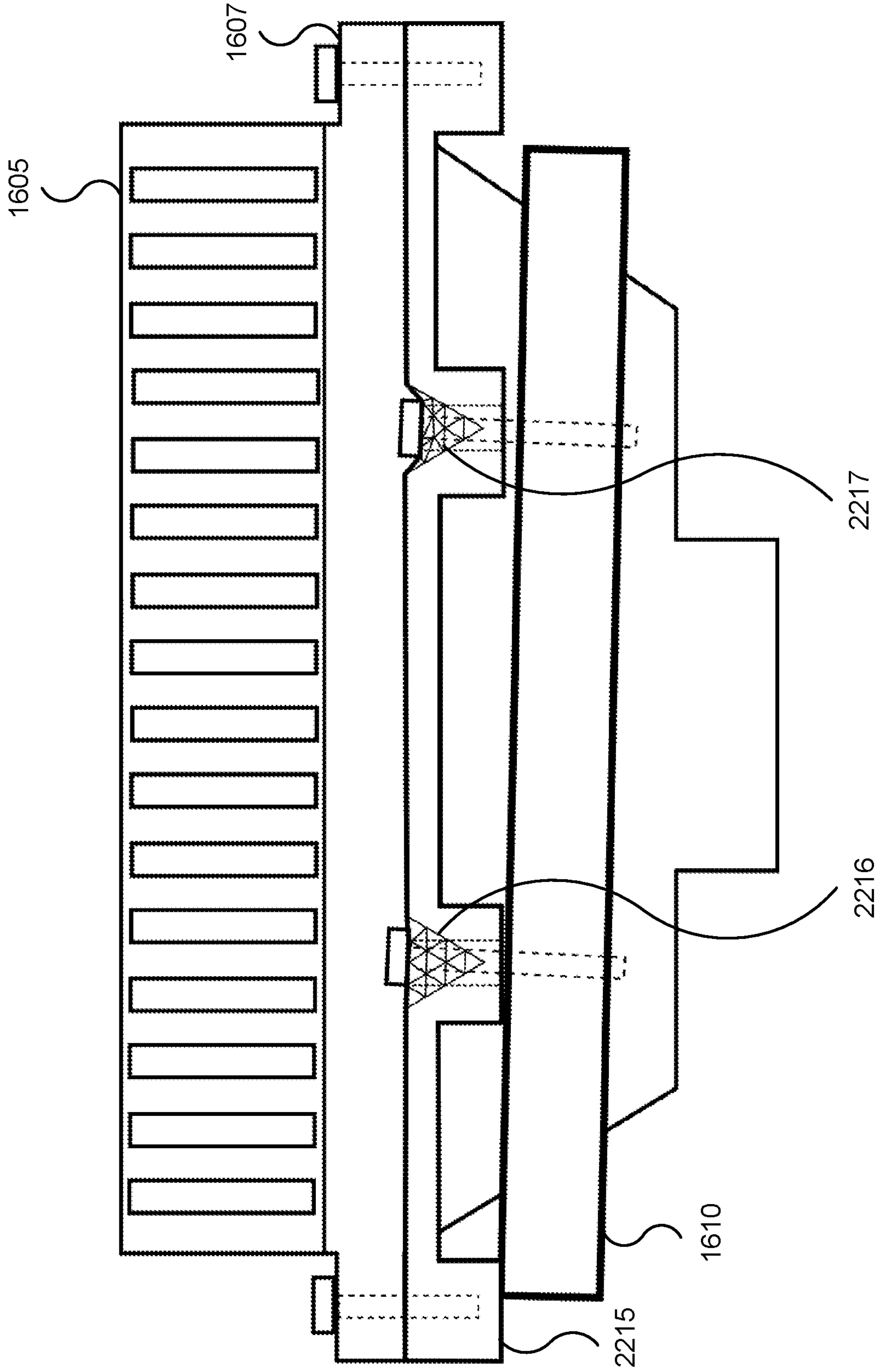
FIG. 23 shows a schematic side elevation view of the assembly of FIG. 22 after having been exposed to an impact force or energy.

FIG. 23 shows yet another schematic side elevation view of motor 1605 and deck body 1610 assembly. FIG. 23 is similar to FIG. 22, with a difference being that in FIG. 23 EAD 2215 has been plastically deformed as a result of absorbing impact energy. In particular, structures 2216 and 2217 of EAD 2215 have been plastically deformed by the impact energy. As shown in FIG. 23, structure 2217 has been deformed more extensively than structure 2216. This differential deformation may be caused by the direction in which the impact force or energy tended to move housing 1607 relative to body 1610. An impact energy tending to move motor 1605 relative to body 1610 may be at least partially absorbed by EAD 2215. By absorbing at least some of this impact energy, EAD 2215 reduces the likelihood of the impact energy damaging motor 1605 or body 1610.

In the case of the EADs shown in FIGS. 16-23, the design approach is similar to that described above in relation to mower motors and decks, namely to interpose a deformable structure between the motor housing and the mounting structure such that arbitrary loads and torsion caused by an impact may be absorbed by the EAD through the motor housing.

While the examples shown in the drawings depict the motor housing as being attached to a mower deck body, it is contemplated that in some examples the motor housing may be coupled to a different component of the deck or a different component of the mower. In addition, while the examples shown in the drawings depict deck and motor of a mower, it is contemplated that in some examples the energy absorbing devices and schemes described herein may also be used in other powered devices such as snow blowers, and the like.

It should be recognized that features and aspects of the various examples provided herein may be combined into further examples that also fall within the scope of the present disclosure.

The invention claimed is:

1. A powered device comprising:
- an actuator to power a rotatable shaft coupled to a working member;
- a housing to house the actuator;
- a structural member to be coupled to the housing; and
- an energy absorbing device (EAD) disposed between the housing and the structural member, the EAD to absorb at least a portion of an impact energy of the working member striking an obstacle, the EAD to absorb the portion of the impact energy by being plastically deformed by the portion of the impact energy
- wherein the EAD comprises an annulus having a body and an opening, the shaft to pass through the opening, the body defining a set of holes for coupling the EAD to one of the housing and the structural member the body further comprising a set of mounting modules for coupling the EAD to the other one of the housing and the structural member, each mounting module comprising on extension terminating in a corresponding mounting hole, whereby a gap separates at least a portion of each extension from the rest of the body, at least a portion of at least one of the extensions to be at least partially deformed plastically by the portion of the impact energy.

2. The powered device of claim 1, wherein the portion of the impact energy comprises at least a component of the impact energy comprising an off-axis load relative to a rotational axis of the shaft.

3. The powered device of claim 1, wherein the housing is coupled to the EAD, and the EAD is coupled to the structural member.

4. The powered device of claim 1, wherein one or more of the extensions are shaped as a peninsula connected at one end to the body and a remainder of the peninsula being separated from the body by the corresponding gap.

5. The powered device of claim 1, wherein one or more of the extensions are formed integrally with the body.

6. The powered device of claim 1, wherein the EAD comprises an at least partially corrugated structure at least partially made of a sheet-like material, the at least partially corrugated structure to be at least partially deformed plastically by the portion of the impact energy.

7. The powered device of claim 1, wherein the EAD comprises a plastically deformable foam supported by a support member, the foam to be at least partially disposed between the housing and the structural member, the foam to be at least partially deformed plastically by the portion of the impact energy.

8. The powered device of claim 1, wherein: the powered device comprises a mower, the actuator comprises an electric motor, the working member comprises a cutting blade of the mower, and the structural member comprises at least a portion of a deck of the mower.

9. A powered device comprising:

an actuator to power a rotatable shaft coupled to a working member;

a housing to house the actuator;

a structural member to be coupled to the housing; and an energy absorbing device (EAD) disposed between the housing and the structural member, the EAD to absorb c t least a portion of an impact energy of the working member striking an obstacle, the EAD to absorb the portion of the impact energy by being plastically deformed by the portion of the impact energy wherein the EAD comprises a first set of mounting points for being coupled to one of the housing and the structural member and a second set of mounting points for being coupled to the other one of the housing and the structural member, the EAD comprising a plastically deformable structure at each of the second set of mounting points.

10. The powered device of claim 9, wherein the deformable structure comprises one or more of a lattice and a truss.

11. An energy absorbing device (EAD) for a powered device:

the EAD to be disposed between a housing for an actuator of the powered device and a structural member of the powered device, the actuator to power a rotatable shaft coupled to a working member, the structural member to be coupled to the housing, the EAD to absorb at least a portion of an impact energy of the working member striking an obstacle, the EAD to absorb the portion of the impact energy by being plastically deformed by the portion of the impact energy;

wherein the EAD comprises an annulus having a body and an opening, the shaft to pass through the opening, the body defining a set of holes for coupling the EAD to one of the housing and the structural member, the body further comprising a set of mounting modules for coupling the EAD to the other one of the housing and the structural member, each mounting module comprising an extension terminating in a corresponding mounting hole, whereby a gap separates at least a portion of each extension from the rest of the body, at least a portion of at least one of the extensions to be at least partially deformed plastically by the portion of the impact energy.

12. The EAD of claim 11, wherein the portion of the impact energy comprises at least a component of the impact energy comprising an off-axis load relative to a rotational axis of the shaft.

13. The EAD of claim 11, wherein the housing is to be coupled to the EAD, and the EAD is to be coupled to the structural member.

14. The EAD of claim 11, wherein one or more of the extensions are shaped as a peninsula connected at one end to the body and a remainder of the peninsula being separated from the body by the corresponding gap.

15. The EAD of claim 11, wherein one or more of the extensions are formed integrally with the body.

16. The EAD of claim 11, wherein the EAD comprises an at least partially corrugated structure at least partially made of a sheet-like material, the at least partially corrugated structure to be at least partially deformed plastically by the portion of the impact energy.

17. The EAD of claim 11, wherein the EAD comprises a plastically deformable foam supported by a support member, the foam to be at least partially disposed between the housing and the structural member, the foam to be at least partially deformed plastically by the portion of the impact energy.

18. The EAD of claim 11, wherein: the powered device comprises a mower, the actuator comprises an electric motor, the working member comprises a cutting blade of the mower, and the structural member comprises at least a portion of a deck of the mower.

19. An energy absorbing device (EAD) for a powered device:

the EAD to be disposed between a housing for an actuator of the powered device and a structural member of the powered device, the actuator to power a rotatable shaft coupled to a working member, the structural member to be coupled to the housing, the EAD to absorb at least a portion of an impact energy of the working member striking an obstacle, the EAD to absorb the portion of the impact energy by being plastically deformed by the portion of the impact energy;

wherein the EAD comprises a first set of mounting points for being coupled to one of the housing and the structural member and a second set of mounting points for being coupled to the other one of the housing and the structural member, the EAD comprising a plastically deformable structure at each of the second set of mounting points.

20. The EAD of claim 19, wherein the deformable structure comprises one or more of a lattice and a truss.

* * * * *